(12) United States Patent
Halliday et al.

(10) Patent No.: US 7,097,074 B2
(45) Date of Patent: Aug. 29, 2006

(54) MACHINE FOR THE PREPARATION OF BEVERAGES

(75) Inventors: Andrew Halliday, Hook Norton (GB); Steve Carter, London (GB)

(73) Assignee: Kraft Foods R&D, Inc., (DE)

( * ) Notice: Subject to any disclaimer, the term of this patent is extended or adjusted under 35 U.S.C. 154(b) by 220 days.

(21) Appl. No.: 10/763,634

(22) Filed: Jan. 23, 2004

(65) Prior Publication Data

US 2004/0188459 A1 Sep. 30, 2004

Related U.S. Application Data

(60) Provisional application No. 60/462,538, filed on Apr. 11, 2003.

(30) Foreign Application Priority Data

Jan. 24, 2003 (GB) ................................. 0301734.0

(51) Int. Cl.
B67D 5/00 (2006.01)

(52) U.S. Cl. ........................................ 222/85; 222/325

(58) Field of Classification Search .................. 222/83, 222/83.5, 85

See application file for complete search history.

(56) References Cited

U.S. PATENT DOCUMENTS

| | | | |
|---|---|---|---|
| 1,576,735 | A | 3/1926 | Fessenden |
| 3,083,101 | A | 3/1963 | Noury |
| 3,403,617 | A * | 10/1968 | Lampe ........................ 99/295 |
| 3,790,029 | A | 2/1974 | Ward |
| D255,529 | S | 6/1980 | Dziekonski |
| 4,382,402 | A | 5/1983 | Alvarez |
| 4,471,689 | A | 9/1984 | Piana |
| 4,484,515 | A | 11/1984 | Illy |
| 4,551,611 | A | 11/1985 | Longo |
| 4,653,390 | A | 3/1987 | Hayes |
| 4,724,752 | A | 2/1988 | Aliesch et al. |
| 4,738,378 | A | 4/1988 | Oakley et al. |
| 4,744,291 | A | 5/1988 | Wallin |
| 4,787,299 | A | 11/1988 | Levi et al. |
| 4,806,375 | A | 2/1989 | Favre |

(Continued)

FOREIGN PATENT DOCUMENTS

EP 0 057 671 A2 8/1982

(Continued)

OTHER PUBLICATIONS

The United Kingdom Patent Office Combined Search and Examination Report for GB 0301709.2 dated May 8, 2003.

(Continued)

*Primary Examiner*—Michael Mar
*Assistant Examiner*—Melvin A Cartegena
(74) *Attorney, Agent, or Firm*—Fitch, Even, Tabin & Flannery

(57) ABSTRACT

A closure mechanism for a beverage preparation machine comprising a fixed lower part, an upper part rotatable relative to the lower part and a cartridge holder interposed between the lower part and the upper part and being rotatable relative to the lower part and the upper part, wherein the lower part comprises inlet piercing means and outlet piercing means for forming, respectively, an inlet and an outlet, in use, in a cartridge received in the cartridge holder, wherein rotation of the upper part towards the lower part causes the upper part to engage the cartridge holder and to move the cartridge holder into contact with the lower part and at the same time to cause, in use, the inlet piercing means and the outlet piercing means to pierce a cartridge received in the cartridge holder.

8 Claims, 24 Drawing Sheets

U.S. PATENT DOCUMENTS

| | | | |
|---|---|---|---|
| 4,818,544 A | 4/1989 | Seward | |
| 4,838,152 A | 6/1989 | Kubicko et al. | |
| 4,846,052 A | 7/1989 | Favre et al. | |
| 4,853,234 A | 8/1989 | Bentley et al. | |
| 4,873,915 A | 10/1989 | Newman et al. | |
| 4,876,953 A | 10/1989 | Imamura et al. | |
| 4,886,674 A | 12/1989 | Seward et al. | |
| 4,917,005 A | 4/1990 | Knepler | |
| 4,920,870 A | 5/1990 | Newman et al. | |
| 4,921,712 A | 5/1990 | Malmquist | |
| 4,990,352 A | 2/1991 | Newman et al. | |
| 5,014,611 A | 5/1991 | Illy et al. | |
| 5,063,836 A | 11/1991 | Patel | |
| 5,072,660 A | 12/1991 | Helbling | |
| 5,082,676 A | 1/1992 | Love et al. | |
| 5,134,924 A | 8/1992 | Vicker | |
| 5,178,058 A | 1/1993 | van Dort et al. | |
| 5,183,998 A | 2/1993 | Hoffman et al. | |
| 5,186,096 A | 2/1993 | Willi | |
| 5,197,374 A | 3/1993 | Fond | |
| 5,242,702 A | 9/1993 | Fond | |
| 5,259,295 A | 11/1993 | Timm | |
| 5,265,520 A | 11/1993 | Giuliano | |
| 5,272,960 A | 12/1993 | Kinna | |
| 5,285,717 A | 2/1994 | Knepler | |
| 5,287,797 A | 2/1994 | Grykiewicz et al. | |
| 5,303,639 A | 4/1994 | Bunn et al. | |
| 5,325,765 A | 7/1994 | Sylvan et al. | |
| 5,327,815 A | 7/1994 | Fond et al. | |
| 5,343,799 A | 9/1994 | Fond | |
| 5,347,916 A | 9/1994 | Fond et al. | |
| 5,349,897 A | 9/1994 | King et al. | |
| 5,375,508 A | 12/1994 | Knepler et al. | |
| 5,398,595 A | 3/1995 | Fond et al. | |
| 5,398,596 A | 3/1995 | Fond | |
| 5,408,917 A | 4/1995 | Lüssi | |
| 5,440,972 A | 8/1995 | English | |
| 5,455,887 A | 10/1995 | Dam | |
| 5,463,932 A | 11/1995 | Olson | |
| 5,472,719 A | 12/1995 | Favre | |
| 5,479,849 A | 1/1996 | King et al. | |
| 5,531,152 A | 7/1996 | Gardosi | |
| 5,531,604 A | 7/1996 | Huang | |
| 5,549,035 A | 8/1996 | Wing-Chung | |
| 5,603,254 A | 2/1997 | Fond et al. | |
| 5,637,335 A | 6/1997 | Fond et al. | |
| 5,638,741 A | 6/1997 | Cisaria | |
| 5,639,023 A | 6/1997 | Hild et al. | |
| 5,649,412 A | 7/1997 | Binacchi | |
| 5,649,472 A | 7/1997 | Fond et al. | |
| 5,704,275 A | 1/1998 | Warne | |
| 5,738,001 A | 4/1998 | Liverani | |
| 5,762,987 A | 6/1998 | Fond et al. | |
| 5,776,527 A | 7/1998 | Blanc | |
| 5,794,519 A * | 8/1998 | Fischer | 99/295 |
| 5,826,492 A | 10/1998 | Fond et al. | |
| 5,840,189 A | 11/1998 | Sylvan et al. | |
| 5,858,437 A | 1/1999 | Anson | |
| 5,862,738 A | 1/1999 | Warne | |
| 5,895,672 A | 4/1999 | Cooper | |
| 5,897,899 A | 4/1999 | Fond | |
| 5,921,168 A | 7/1999 | Nello | |
| 5,948,455 A | 9/1999 | Schaeffer et al. | |
| 5,967,021 A | 10/1999 | Yung | |
| 5,974,950 A | 11/1999 | King | |
| 5,992,298 A | 11/1999 | Illy et al. | |
| 6,000,317 A | 12/1999 | Van Der Meer | |
| 6,006,653 A | 12/1999 | Sham et al. | |
| 6,009,792 A | 1/2000 | Kraan | |
| D419,821 S | 2/2000 | Powell et al. | |
| 6,021,705 A | 2/2000 | Dijs | |
| 6,025,000 A | 2/2000 | Fond et al. | |
| D423,863 S | 5/2000 | Lupi | |
| 6,062,127 A | 5/2000 | Klosinski et al. | |
| 6,068,871 A | 5/2000 | Fond et al. | |
| 6,082,245 A | 7/2000 | Nicolai | |
| 6,095,031 A | 8/2000 | Warne | |
| 6,109,168 A | 8/2000 | Illy et al. | |
| 6,117,471 A | 9/2000 | King | |
| 6,142,063 A | 11/2000 | Beaulieu et al. | |
| 6,170,386 B1 | 1/2001 | Paul | |
| 6,173,117 B1 | 1/2001 | Clubb | |
| 6,178,874 B1 | 1/2001 | Joergensen | |
| 6,182,554 B1 | 2/2001 | Beaulieu et al. | |
| 6,186,051 B1 | 2/2001 | Aarts | |
| D443,792 S | 6/2001 | Peters et al. | |
| 6,240,832 B1 | 6/2001 | Schmed et al. | |
| 6,240,833 B1 | 6/2001 | Sham et al. | |
| 6,245,371 B1 | 6/2001 | Gutwein et al. | |
| 6,279,459 B1 | 8/2001 | Mork et al. | |
| 6,289,948 B1 | 9/2001 | Jeannin et al. | |
| D452,107 S | 12/2001 | Cahen | |
| 6,347,725 B1 | 2/2002 | Yoakim et al. | |
| 6,358,545 B1 | 3/2002 | Chandler et al. | |
| 6,405,637 B1 | 6/2002 | Cai | |
| D459,628 S | 7/2002 | Cahen | |
| D460,653 S | 7/2002 | Cahen | |
| D461,358 S | 8/2002 | Cahen | |
| 6,499,388 B1 * | 12/2002 | Schmed | 99/295 |
| D475,567 S | 6/2003 | Hsu | |
| 6,606,938 B1 | 8/2003 | Taylor | |
| 6,607,762 B1 | 8/2003 | Lazaris et al. | |
| D479,939 S | 9/2003 | Au | |
| 6,612,224 B1 | 9/2003 | Mercier et al. | |
| 6,645,537 B1 | 11/2003 | Sweeney et al. | |
| 6,655,260 B1 | 12/2003 | Lazaris et al. | |
| D489,930 S | 5/2004 | Tse | |
| 2001/0048957 A1 | 12/2001 | Lazaris et al. | |
| 2002/0002913 A1 | 1/2002 | Mariller et al. | |
| 2002/0015768 A1 | 2/2002 | Masek et al. | |
| 2002/0023543 A1 | 2/2002 | Schmed | |
| 2002/0048621 A1 | 4/2002 | Boyd et al. | |
| 2002/0078831 A1 | 6/2002 | Cai | |
| 2002/0088807 A1 | 7/2002 | Perkovic et al. | |
| 2002/0121197 A1 | 9/2002 | Mercier et al. | |
| 2002/0121198 A1 | 9/2002 | Kollep et al. | |
| 2002/0124736 A1 | 9/2002 | Kollep et al. | |
| 2002/0129712 A1 | 9/2002 | Westbrook et al. | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2002/0148357 A1 | 10/2002 | Lazaris et al. | |
| 2003/0005826 A1 | 1/2003 | Sargent et al. | |
| 2003/0039731 A1 | 2/2003 | Dalton et al. | |
| 2003/0056655 A1 | 3/2003 | Kollep et al. | |
| 2003/0145736 A1 | 8/2003 | Green | |
| 2003/0222089 A1 | 12/2003 | Hale | |

FOREIGN PATENT DOCUMENTS

| | | |
|---|---|---|
| EP | 0 151 252 A1 | 8/1985 |
| EP | 0 272 922 A2 | 6/1988 |
| EP | 0 334 571 A1 | 9/1989 |
| EP | 0 334 572 A1 | 9/1989 |
| EP | 0 449 533 A1 | 10/1991 |
| EP | 0 451 980 A2 | 10/1991 |
| EP | 0 455 337 A1 | 11/1991 |
| EP | 0 469 162 A1 | 2/1992 |
| EP | 0 521 510 A1 | 1/1993 |
| EP | 0 524 464 A1 | 1/1993 |
| EP | 0 638 486 A1 | 2/1995 |
| EP | 0 604 615 B1 | 9/1998 |
| EP | 0 862 882 A1 | 9/1998 |
| EP | 0 870 457 A1 | 10/1998 |

| | | |
|---|---|---|
| EP | 0 904 718 A1 | 3/1999 |
| EP | 0 730 425 B1 | 5/1999 |
| EP | 0 756 844 B1 | 5/1999 |
| EP | 1 042 978 A1 | 10/2000 |
| EP | 1 090 574 A1 | 4/2001 |
| EP | 1 095 605 A1 | 5/2001 |
| EP | 1 101 430 A1 | 5/2001 |
| EP | 1 153 561 A1 | 11/2001 |
| EP | 1 208 782 A1 | 5/2002 |
| EP | 0 862 882 B1 | 7/2002 |
| EP | 1 255 685 A1 | 11/2002 |
| EP | 1 274 332 A1 | 1/2003 |
| EP | 1 316 283 A2 | 6/2003 |
| EP | 1 255 685 B1 | 4/2004 |
| FR | 1 537 031 | 8/1968 |
| FR | 2 322 796 A1 | 4/1977 |
| GB | 468 248 A | 7/1937 |
| GB | 828 529 A | 2/1960 |
| GB | 1 215 840 A | 12/1970 |
| GB | 2 306 432 A | 5/1997 |
| GB | 2 374 795 A | 10/2002 |
| GB | 2 374 816 A | 10/2002 |
| GB | 2 374 856 A | 10/2002 |
| GB | 2 379 624 A | 3/2003 |
| JP | 2000-93309 | 4/2000 |
| WO | WO-88/07472 A1 | 10/1988 |
| WO | WO-95/07648 A1 | 3/1995 |
| WO | WO-95/16377 A1 | 6/1995 |
| WO | WO-97/17006 A1 | 5/1997 |
| WO | WO-98/27854 A1 | 7/1998 |
| WO | WO-00/28868 A1 | 5/2000 |
| WO | WO-00/42891 A1 | 7/2000 |
| WO | WO-01/15582 A1 | 3/2001 |
| WO | WO-01/30218 A1 | 5/2001 |
| WO | WO-01/58786 A1 | 8/2001 |
| WO | WO-01/60219 A1 | 8/2001 |
| WO | WO-01/60220 A1 | 8/2001 |
| WO | WO-01/82760 A1 | 11/2001 |
| WO | WO-02/19875 A1 | 3/2002 |
| WO | WO-02/28241 A1 | 4/2002 |
| WO | WO-02/074143 A2 | 9/2002 |
| WO | WO-02/074661 A1 | 9/2002 |
| WO | WO-02/082962 A1 | 10/2002 |
| WO | WO-02/085170 A2 | 10/2002 |
| WO | WO-02/087400 A1 | 11/2002 |
| WO | WO-02/092439 A2 | 11/2002 |
| WO | WO-02/085170 A3 | 3/2003 |
| WO | WO-03/026470 A2 | 4/2003 |
| WO | WO-03/039309 A1 | 5/2003 |
| WO | WO-03/059778 A2 | 7/2003 |
| WO | WO-03/065859 A2 | 8/2003 |
| WO | WO-03/065859 A3 | 12/2003 |
| WO | WO-03/059778 A3 | 1/2004 |

OTHER PUBLICATIONS

The United Kingdom Patent Office Combined Search and Examination Report for GB 0301702.7 dated May 16, 2003.
The United Kingdom Patent Office Combined Search and Examination Report for GB 0301696.1 dated May 27, 2003.
The United Kingdom Patent Office Combined Search and Examination Report for GB 0301747.2 dated May 30, 2003.
The United Kingdom Patent Office Combined Search and Examination Report for GB 0301738.1 dated Jun. 9, 2003.
The United Kingdom Patent Office Combined Search and Examination Report for GB 0301708.4 dated Jun. 12, 2003.
The United Kingdom Patent Office Combined Search and Examination Report for GB 0301710.0 dated Jun. 12, 2003.
The United Kingdom Patent Office Combined Search and Examination Report for GB 0301679.7 dated Jun. 16, 2003.
The United Kingdom Patent Office Combined Search and Examination Report for GB 0301698.7 dated Jun. 16, 2003.
The United Kingdom Patent Office Combined Search and Examination Report for GB 0301741.5 dated Jun. 16, 2003.
The United Kingdom Patent Office Combined Search and Examination Report for GB 0301739.9 dated Jun. 17, 2003.
The United Kingdom Patent Office Combined Search and Examination Report for GB 0301745.6 dated Jun. 17, 2003.
The United Kingdom Patent Office Combined Search and Examination Report for GB 0301680.5 dated Jun. 19, 2003.
The United Kingdom Patent Office Combined Search and Examination Report for GB 0301681.3 dated Jun. 24, 2003.
The United Kingdom Patent Office Combined Search and Examination Report for GB 0301733.2 dated Jun. 27, 2003.
The United Kingdom Patent Office Combined Search and Examination Report for GB 0301734.0 dated Jun. 27, 2003.
The United Kingdom Patent Office Combined Search and Examination Report for GB 0301735.7 dated Jul. 4, 2003.
The United Kingdom Patent Office Combined Search and Examination Report for GB 0301713.4 dated Jul. 16, 2003.
European Patent Office Search Report for EP 04 25 0366.4 dated Mar. 18, 2004.
European Patent Office Search Report for EP 04 25 0362.3 dated Mar. 22, 2004.
European Patent Office Search Report for EP 04 25 0376.3 dated Mar. 23, 2004.
European Patent Office Search Report for EP 04 25 0361.5 dated May 4, 2004.
European Patent Office Search Report for EP 04 25 0360.7 dated May 7, 2004.
European Patent Office Search Report for EP 04 25 0365.6 dated May 7, 2004.
European Patent Office Search Report for EP 04 25 0377.1 dated May 7, 2004.
European Patent Office Search Report for EP 04 25 0381.3 dated May 7, 2004.
European Patent Office Search Report for EP 04 25 0382.1 dated May 7, 2004.
European Patent Office Search Report for EP 04 25 0384.7 dated May 7, 2004.
European Patent Office Search Report for EP 04 25 0380.5 dated May 10, 2004.
European Patent Office Search Report for EP 04 25 0357.3 dated May 11, 2004.
European Patent Office Search Report for EP 04 25 0364.9 dated May 11, 2004.
European Patent Office Search Report for EP 04 25 0363.1 dated May 17, 2004.
European Patent Office Search Report for EP 04 25 0389.6 dated May 17, 2004.
European Patent Office Search Report for EP 04 25 0383.9 dated May 28, 2004.
European Patent Office Search Report for EP 04 25 0388.8 dated Jun. 1, 2004.
European Patent Office Search Report for EP 04 25 0390.4 dated Jun. 17, 2004.
PCT Invitation to Pay Additional Fees and Communication Relating to the Results of the Partial International Search for PCT/GB2004/000272 dated May 11, 2004.
PCT International Search Report and Written Opinion of the International Searching Authority for PCT/GB2004/000273 dated May 12, 2004.
PCT International Search Report and Written Opinion of the International Searching Authority for PCT/GB2004/000279 dated May 17, 2004.
PCT International Search Report and Written Opinion of the International Searching Authority for PCT/GB2004/000268 dated May 24, 2004.
PCT Invitation to Pay Additional Fees and Communication Relating to the Results of the Partial International Search for PCT/GB2004/000276 dated May 24, 2004.
PCT International Search Report and Written Opinion of the International Searching Authority for PCT/GB2004/000282 dated Jun. 3, 2004.

PCT International Search Report and Written Opinion of the International Searching Authority for PCT/GB2004/000287 dated Jun. 16, 2004.

PCT Invitation to Pay Additional Fees and Communication Relating to the Results of the Partial International Search for PCT/GB2004/000265 dated Jun. 17, 2004.

PCT International Search Report and Written Opinion of the International Searching Authority for PCT/GB2004/000272 dated Sep. 7, 2004.

PCT International Search Report and Written Opinion of the International Searching Authority for PCT/GB2004/000276 dated Sep. 7, 2004.

* cited by examiner

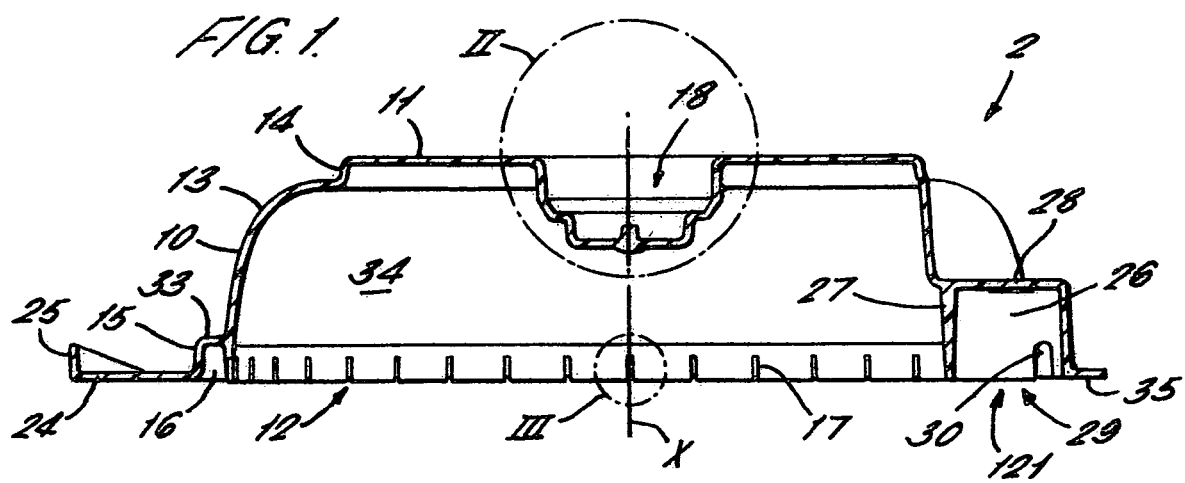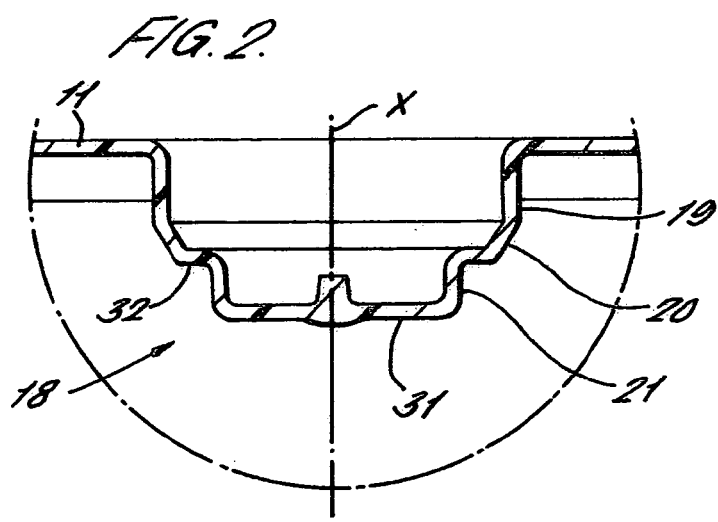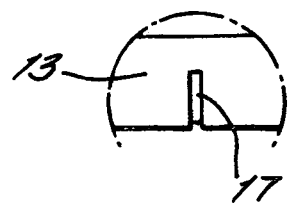

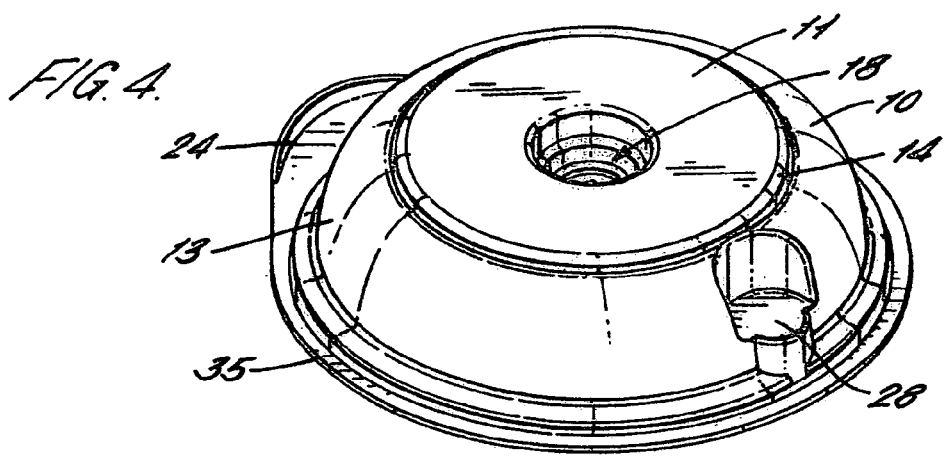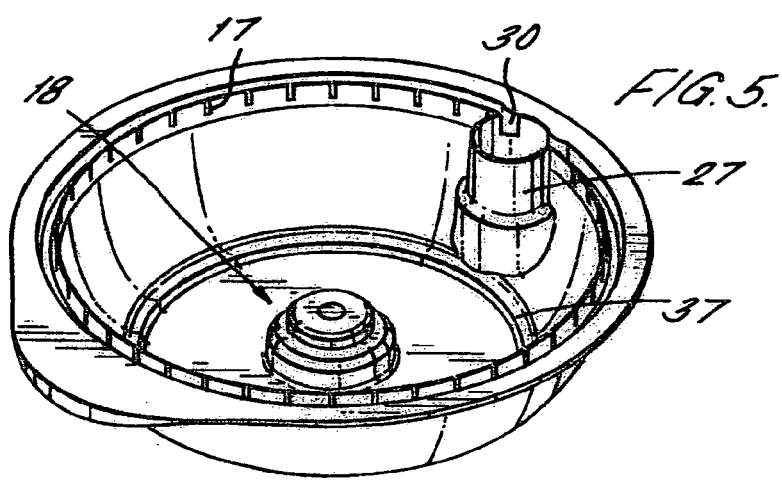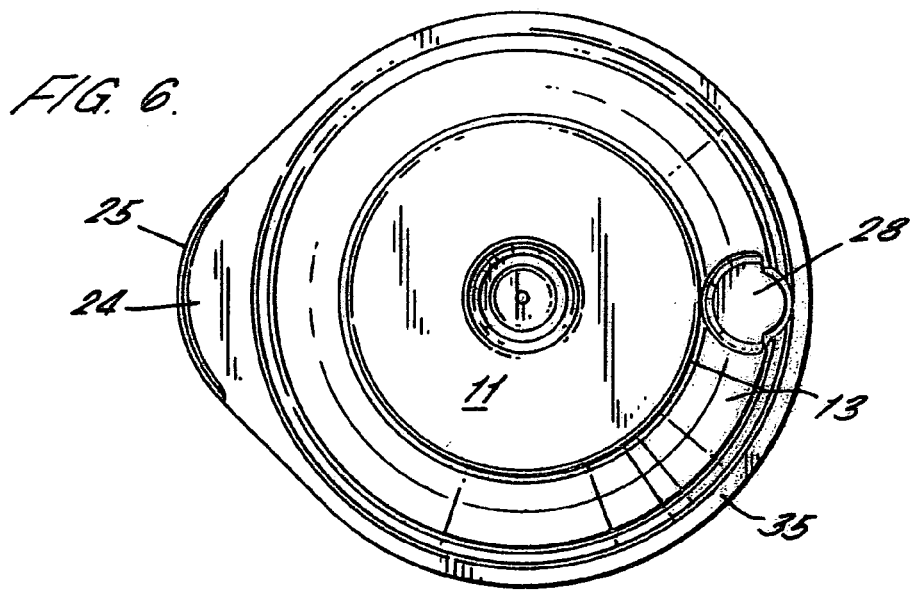

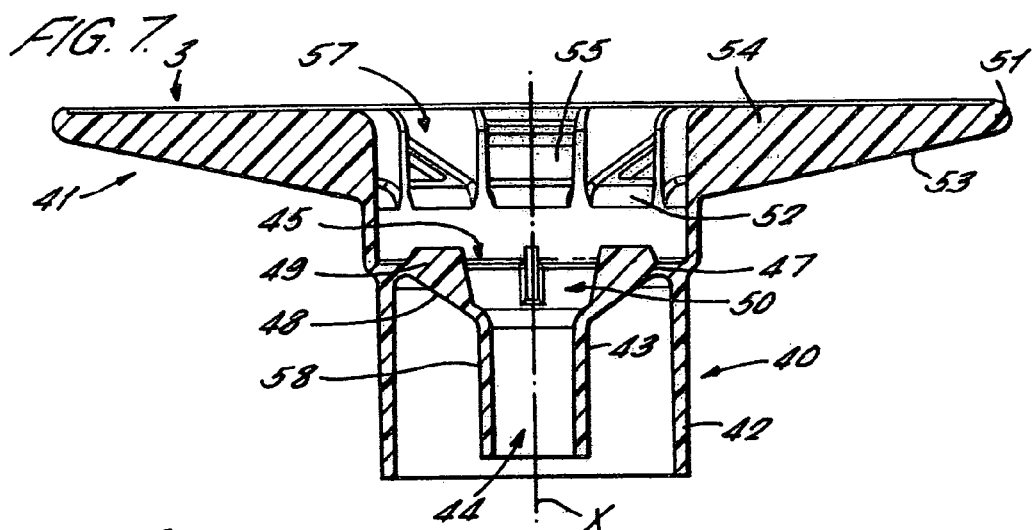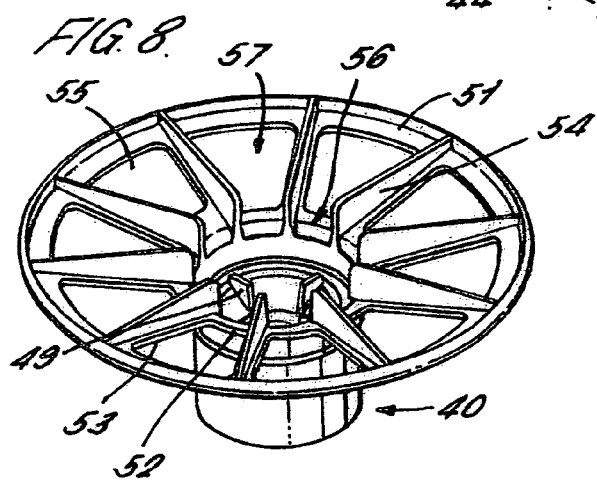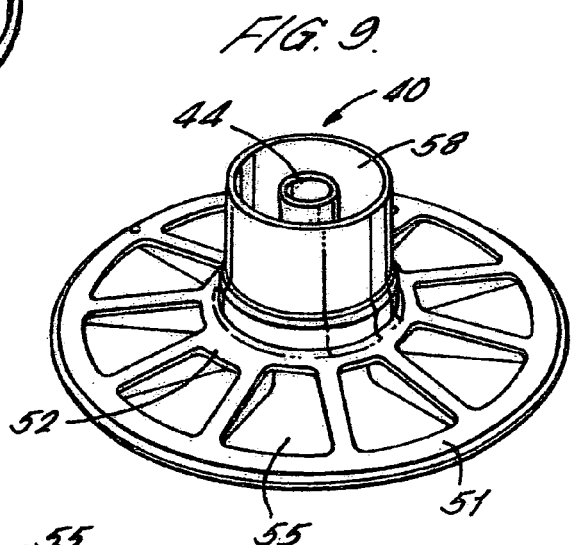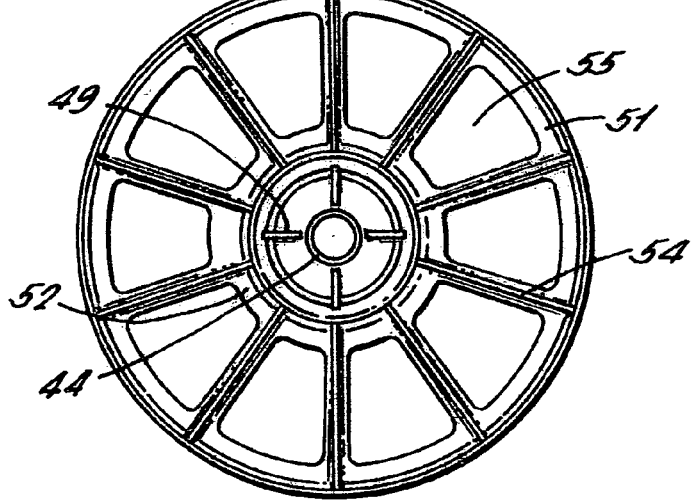

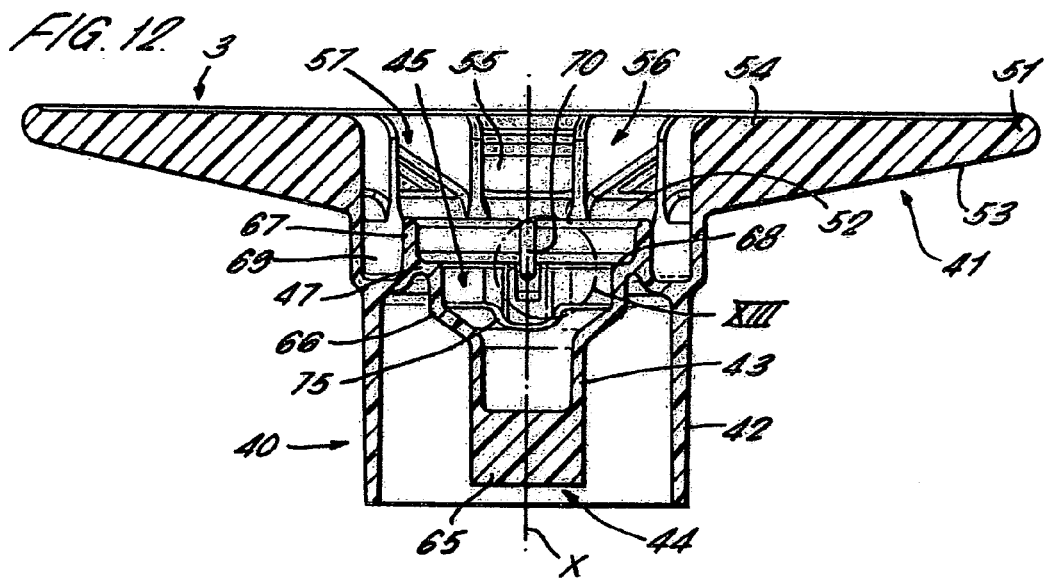
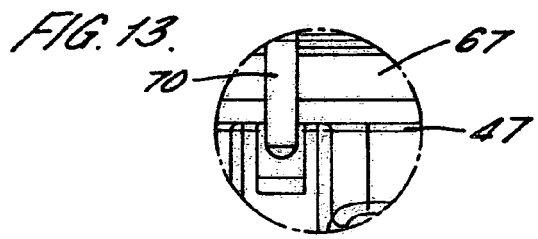
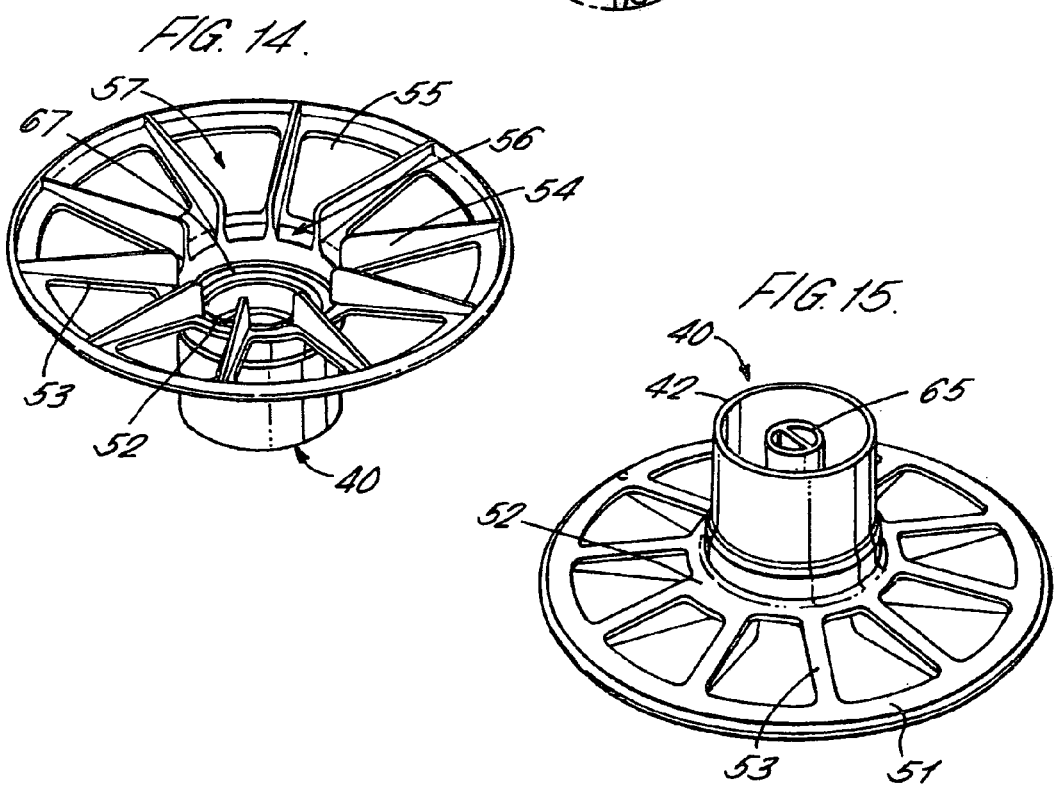

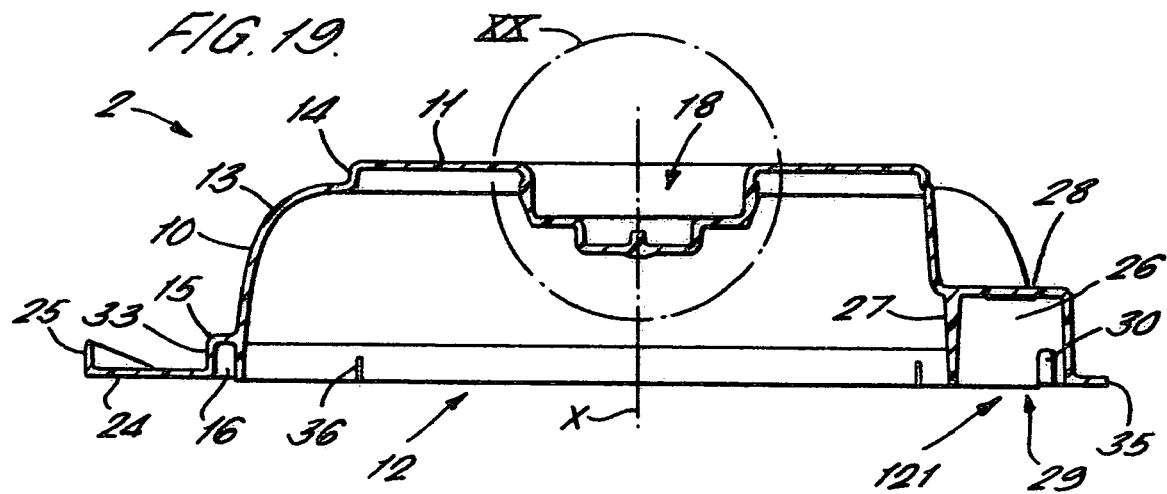
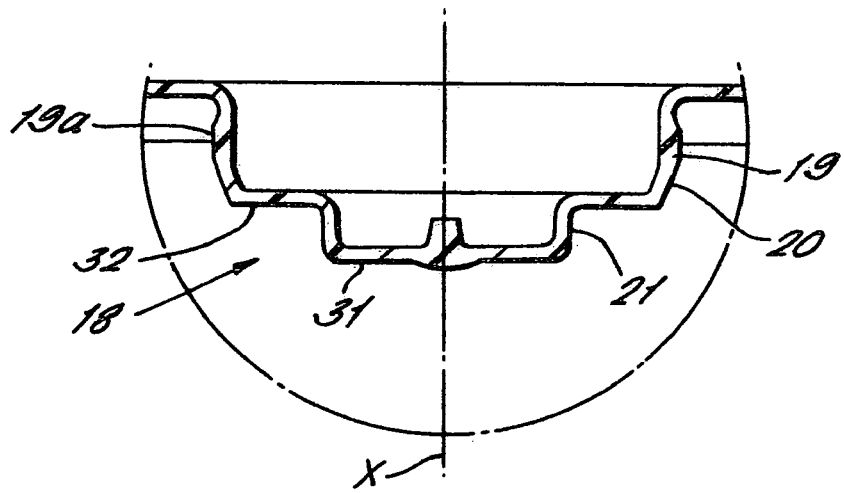

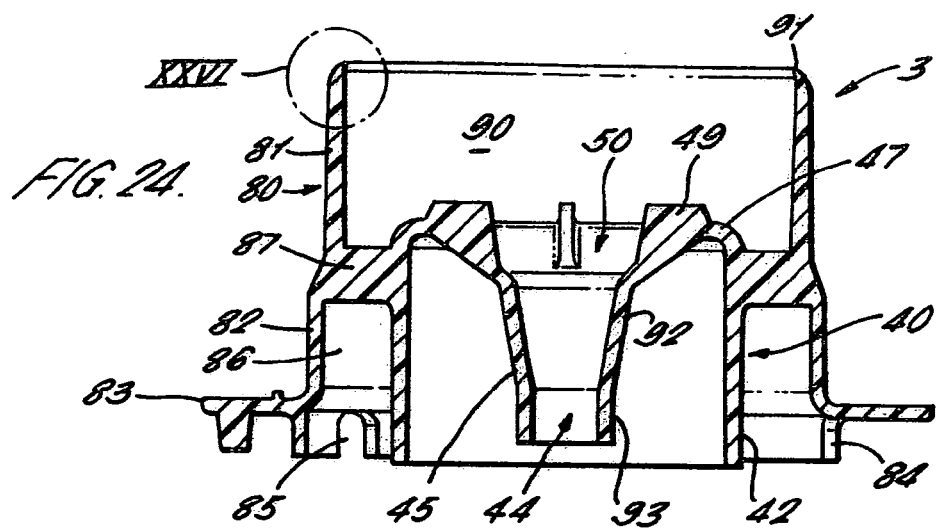
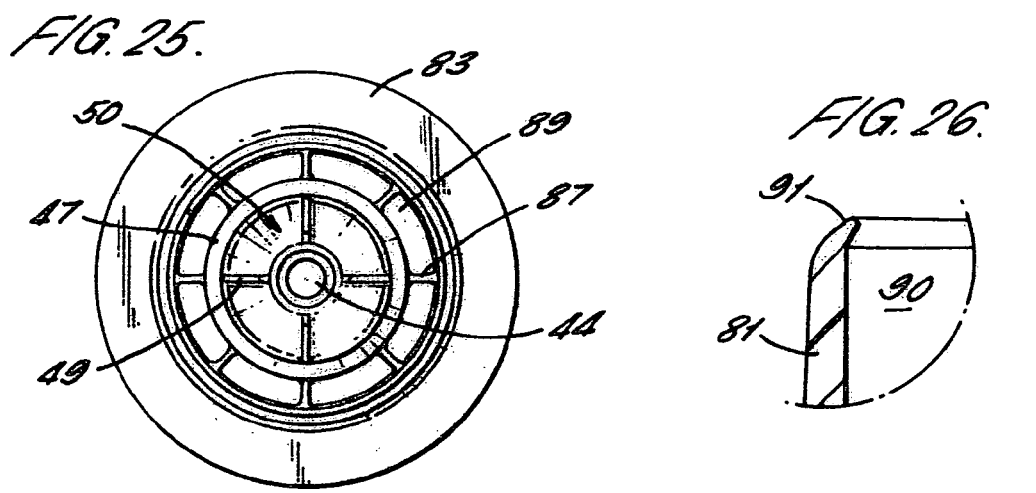
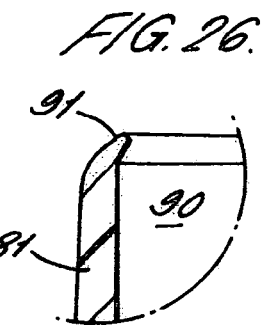
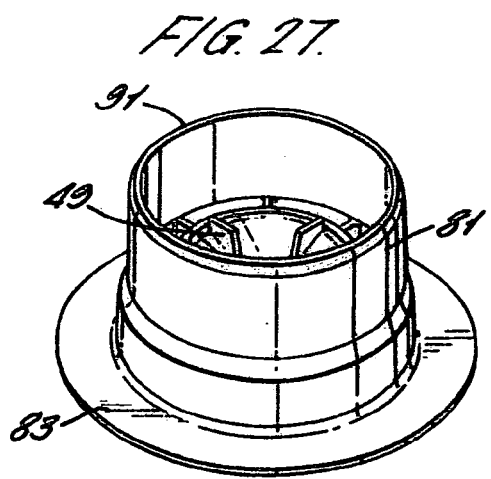
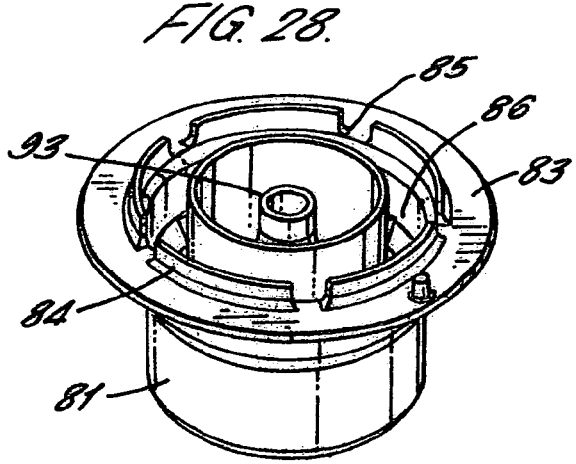

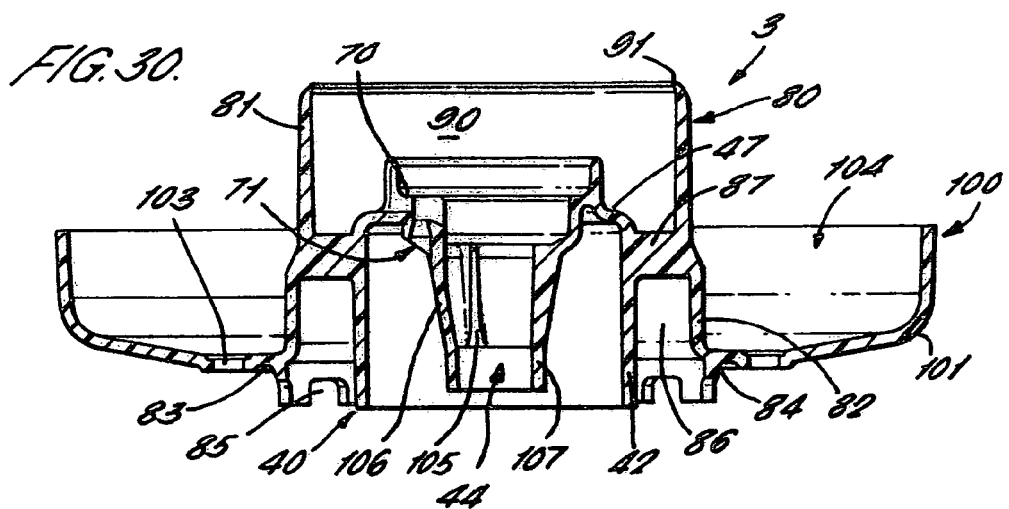
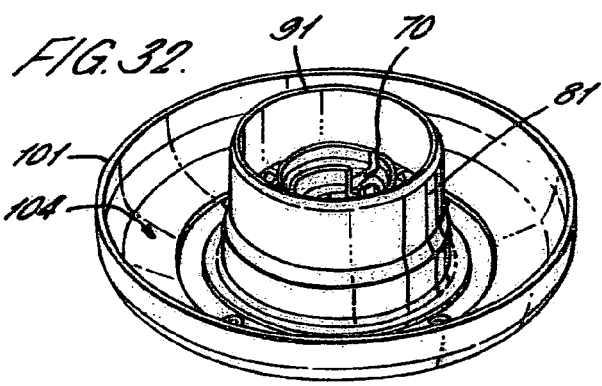
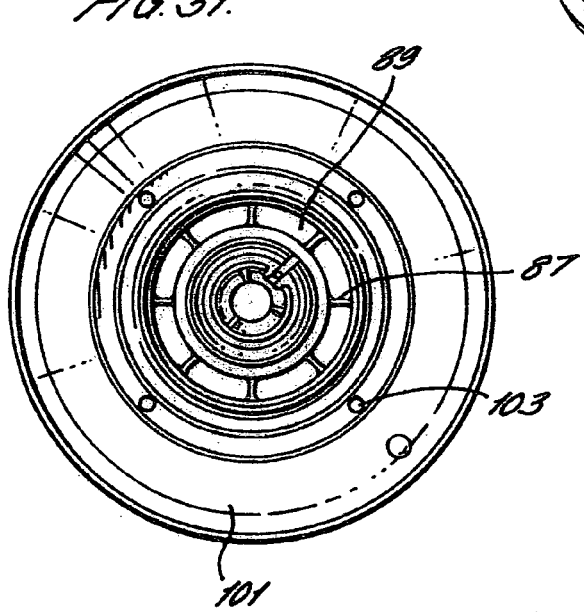
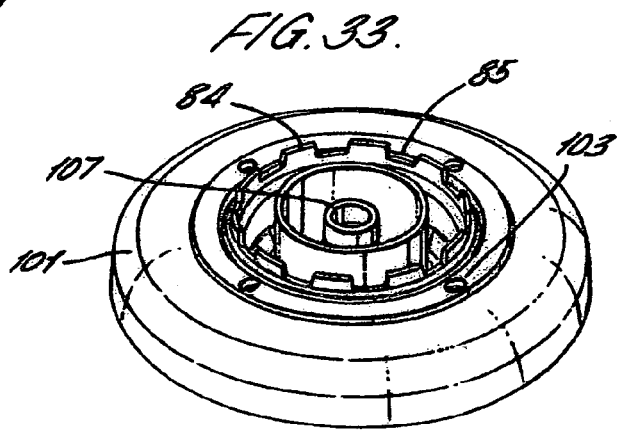

MACHINE FOR THE PREPARATION OF BEVERAGES

RELATED APPLICATION

This application claims priority from U.S. provisional patent application No. 60/462,538, filed Apr. 11, 2003, which is hereby incorporated by reference.

BACKGROUND

The present invention relates to a machine for the preparation of beverages and, in particular, for use with sealed cartridges which are formed from substantially air- and water-impermeable materials and which contain one or more ingredients for the preparation of beverages.

It has previously been proposed to seal beverage preparation ingredients in individual air-impermeable packages for use in beverage machines. For example, cartridges or capsules containing compacted ground coffee are known for use in certain coffee preparation machines which are generally termed "espresso" machines. In the production of coffee using these preparation machines the coffee cartridge is placed in a brewing chamber and hot water is passed though the cartridge at relatively high pressures, thereby extracting the aromatic coffee constituents from the ground coffee to produce the coffee beverage. Typically, such machines operate at a pressure of greater than $6 \times 10^5$ Pa. The preparation machines of the type described have to date been relatively expensive since components of the machine, such as the water pumps and seals, must be able to withstand the high pressures.

In WO01/58786 there is described a cartridge for the preparation of beverages which operates at a pressure generally in the range 0.7 to $2.0 \times 10^5$ Pa. However, the cartridge is designed for use in a beverage preparation machine for the commercial or industrial market and is relatively expensive. Hence, there remains a requirement for a cartridge for the preparation of beverages wherein the cartridges and beverage preparation machine are suitable, in particular, for the domestic market in terms of cost, performance and reliability. There is also a need for a beverage preparation machine for such cartridges which is simple to operate and reliable in operation. In particular, the means for inserting and withdrawing the beverage cartridge must be simple to operate.

SUMMARY

Accordingly, the present invention provides a closure mechanism for a beverage preparation machine comprising a fixed lower part, an upper part rotatable relative to the lower part and a cartridge holder interposed between the lower part and the upper part and being rotatable relative to the lower part and the upper part, wherein the lower part comprises inlet piercing means and outlet piercing means for forming, respectively, an inlet and an outlet, in use, in a cartridge received in the cartridge holder, wherein rotation of the upper part towards the lower part causes the upper part to engage the cartridge holder and to move the cartridge holder into contact with the lower part and at the same time to cause, in use, the inlet piercing means and the outlet piercing means to pierce a cartridge received in the cartridge holder.

The closure mechanism of the present invention provides a reliable and inexpensive mechanism for inserting and withdrawing a beverage cartridge into and from a beverage preparation machine. The mechanism may be operated by one hand and does not require electrical power. Complicated lever arrangements are avoided. In addition, reliable and accurate positioning of the beverage cartridge is assured by means of the cartridge holder. Further, the cartridge mount automatically disengages the beverage cartridge from the inlet and outlet piercers on opening. This greatly increases the ease of removal of the cartridge and ensures that the inlet and outlet piercers are below the level of the cartridge mount when a consumer inserts their hand. This reduces the chances of the consumer injuring themselves.

It will be understood that by the term "cartridge" as used herein is meant any package, container, sachet or receptacle which contains one or more beverage ingredients in the manner described. The cartridge may be rigid, semi-rigid or flexible.

The cartridge for use in the present invention may contain one or more beverage ingredients suitable for the formation of a beverage product. The beverage product may be, for example, one of coffee, tea, chocolate or a dairy-based beverage including milk. The beverage ingredients may be powdered, ground, leaf-based or liquid. The beverage ingredients may be insoluble or soluble. Examples include roast and ground coffee, leaf tea, powdered chocolate and soup, liquid milk-based beverages, carbonated drinks and concentrated fruit juices.

Preferably, the upper part is moveable from between an open position for receiving a cartridge in the cartridge holder and a closed position in which the cartridge holder is in contact with the lower part.

Preferably, in the open position the upper part is orientated substantially vertically. This allows for improved access to the cartridge mount for ease of inserting and withdrawing the cartridge. In the closed position the upper part is orientated horizontally.

Preferably, the cartridge holder comprises a recess for receiving a cartridge. The recess may comprise an irregularity for preventing rotation of a cartridge received in the recess.

Preferably, the cartridge holder is biased relative to the fixed lower part such that in an open position with the upper part disengaged from the lower part and the cartridge holder, the cartridge holder is disengaged from the lower part. In addition, in the open position, the cartridge holder may be disengaged from the inlet piercing means and the outlet piercing means.

In the following description the terms "upper" and "lower" and equivalents will be used to describe the relational positioning of features of the invention. The terms "upper" and "lower" and equivalents should be understood to refer to the cartridge (or other components) in its normal orientation for insertion into a beverage preparation machine and subsequent dispensing as shown, for example, in FIG. 4. In particular, "upper" and "lower" refer, respectively, to relative positions nearer or further from a top surface 11 of the cartridge. In addition, the terms "inner" and "outer" and equivalents will be used to describe the relational positioning of features of the invention. The terms "inner" and "outer" and equivalents should be understood to refer to relative positions in the cartridge (or other components) being, respectively, nearer or further from a centre or major axis X of the cartridge 1 (or other component).

BRIEF DESCRIPTION OF THE DRAWINGS

Embodiments of the present invention will now be described, by way of example only, with reference to the accompanying drawings, in which:

FIG. 1 is cross-sectional drawing of an outer member of first and second embodiments of cartridge;

FIG. 2 is a cross-sectional drawing of a detail of the outer member of FIG. 1 showing an inwardly directed cylindrical extension;

FIG. 3 is a cross-sectional drawing of a detail of the outer member of FIG. 1 showing a slot;

FIG. 4 is a perspective view from above of the outer member of FIG. 1;

FIG. 5 is a perspective view from above of the outer member of FIG. 1 in an inverted orientation;

FIG. 6 is a plan view from above of the outer member of FIG. 1;

FIG. 7 is a cross-sectional drawing of an inner member of the first embodiment of cartridge;

FIG. 8 is a perspective view from above of the inner member of FIG. 7;

FIG. 9 is a perspective view from above of the inner member of FIG. 7 in an inverted orientation;

FIG. 10 is a plan view from above of the inner member of FIG. 7;

FIG. 12 is a cross-sectional drawing of an inner member of the second embodiment of cartridge;

FIG. 13 is a cross-sectional drawing of a detail of the inner member of FIG. 12 showing an aperture;

FIG. 14 is a perspective view from above of the inner member of FIG. 12;

FIG. 15 is a perspective view from above of the inner member of FIG. 12 in an inverted orientation;

FIG. 19 is cross-sectional drawing of an outer member of third and fourth embodiments of cartridge;

FIG. 20 is a cross-sectional drawing of a detail of the outer member of FIG. 19 showing an inwardly directed cylindrical extension;

FIG. 24 is a cross-sectional drawing of an inner member of the third embodiment of cartridge;

FIG. 25 is a plan view from above of the inner member of FIG. 24;

FIG. 26 is a cross-sectional drawing of a detail of the inner member of FIG. 24 showing an in-turned upper rim;

FIG. 27 is a perspective view from above of the inner member of FIG. 24;

FIG. 28 is a perspective view from above of the inner member of FIG. 24 in an inverted orientation;

FIG. 30 is a cross-sectional drawing of an inner member of the fourth embodiment of cartridge;

FIG. 31 is a plan view from above of the inner member of FIG. 30;

FIG. 32 is a perspective view from above of the inner member of FIG. 30;

FIG. 33 is a perspective view from above of the inner member of FIG. 30 in an inverted orientation;

DETAILED DESCRIPTION OF PREFERRED EMBODIMENTS

Figure 11:
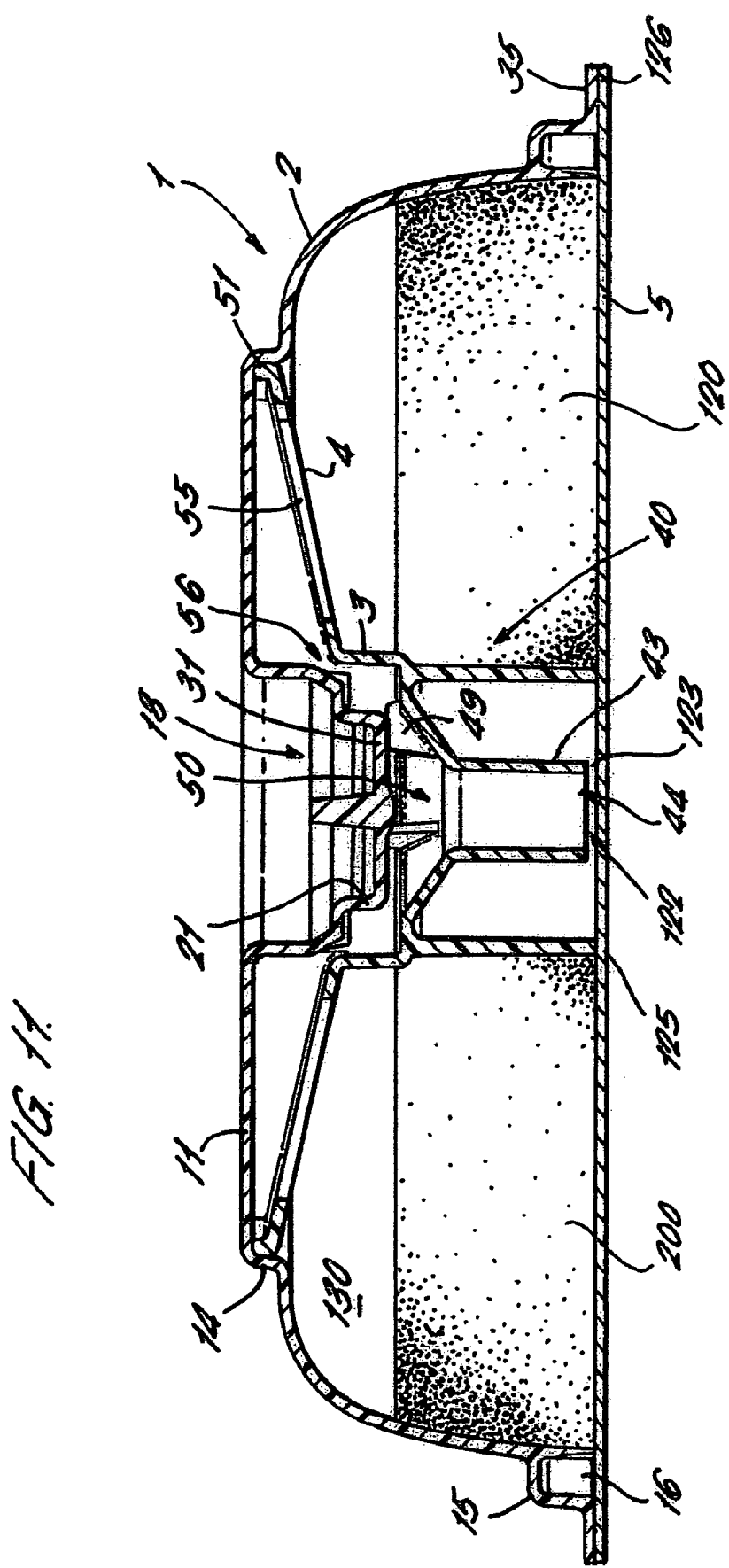
FIG. 11 is a cross-sectional drawing of the first embodiment of cartridge in an assembled condition.

As shown in FIG. 11, the cartridge 1 generally comprises an outer member 2, an inner member 3 and a laminate 5. The outer member 2, inner member 3 and laminate 5 are assembled to form the cartridge 1 which has an interior 120 for containing one or more beverage ingredients, an inlet 121, an outlet 122 and a beverage flow path linking the inlet 121 to the outlet 122 and which passes through the interior 120. The inlet 121 and outlet 122 are initially sealed by the laminate 5 and are opened in use by piercing or cutting of the laminate 5. The beverage flow path is defined by spatial inter-relationships between the outer member 2, inner member 3 and laminate 5 as discussed below. Other components may optionally be included in the cartridge 1, such as a filter 4, as will be described further below.

A first version of cartridge 1 which will be described for background purposes is shown in FIGS. 1 to 11. The first version of the cartridge 1 is particularly designed for use in dispensing filtered products such as roast and ground coffee or leaf tea. However, this version of the cartridge 1 and the other versions described below may be used with other products such as chocolate, coffee, tea, sweeteners, cordials, flavourings, alcoholic beverages, flavoured milk, fruit juices, squashes, sauces and desserts.

As can be seen from FIG. 5, the overall shape of the cartridge 1 is generally circular or disc-shaped with the diameter of the cartridge 1 being significantly greater than its height. A major axis X passes through the centre of the outer member as shown in FIG. 1. Typically the overall diameter of the outer member 2 is 74.5 mm±6 mm and the overall height is 16 mm±3 mm. Typically the volume of the cartridge 1 when assembled is 30.2 ml±20%.

The outer member 2 generally comprises a bowl-shaped shell 10 having a curved annular wall 13, a closed top 11 and an open bottom 12. The diameter of the outer member 2 is smaller at the top 11 compared to the diameter at the bottom 12, resulting from a flaring of the annular wall 13 as one traverses from the closed top 11 to the open bottom 12. The annular wall 13 and closed bottom 11 together define a receptacle having an interior 34.

A hollow inwardly directed cylindrical extension 18 is provided in the closed top 11 centred on the major axis X. As more clearly shown in FIG. 2, the cylindrical extension 18 comprises a stepped profile having first, second and third portions 19, 20 and 21. The first portion 19 is right circular cylindrical. The second portion 20 is frusto-conical in shape and is inwardly tapered. The third portion 21 is another right circular cylinder and is closed off by a lower face 31. The diameter of the first, second and third portion 19, 20 and 21 incrementally decreases such that the diameter of the cylindrical extension 18 decreases as one traverses from the top 11 to the closed lower face 31 of the cylindrical extension 18. A generally horizontal shoulder 32 is formed on the cylindrical extension 18 at the junction between the second and third portions 20 and 21.

An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to provide gas and liquid communication between the manifold 16 and the interior 34 of the outer member 2. As shown in FIG. 3, the slots 17 comprise vertical slits in the annular wall 13. Between 20 and 40 slots are provided. In the embodiment shown thirty-seven slots 17 are provided generally equi-spaced around the circumference of the manifold 16. The slots 17 are preferably between 1.4 and 1.8 mm in length. Typically the length of each slot is 1.6 mm representing 10% of the overall height of the outer member 2. The width of each slot is between 0.25 and 0.35 mm. Typically, the width of each slot is 0.3 mm. The width of the slots 17 is sufficiently narrow to prevent the beverage ingredients passing therethrough into the manifold 16 either during storage or in use.

An inlet chamber 26 is formed in the outer member 2 at the periphery of the outer member 2. A cylindrical wall 27 is provided, as most clearly shown in FIG. 5, which defines the inlet chamber 26 within, and partitions the inlet chamber 26 from, the interior 34 of the outer member 2. The cylindrical wall 27 has a closed upper face 28 which is formed on a plane perpendicular to the major axis X and an open lower end 29 co-planar with the bottom 12 of the outer member 2. The inlet chamber 26 communicates with the manifold 16 via two slots 30 as shown in FIG. 1. Alternatively, between one and four slots may be used to communicate between the manifold 16 and the inlet chamber 26.

A lower end of the outwardly extending shoulder 33 is provided with an outwardly extending flange 35 which extends perpendicularly to the major axis X. Typically the flange 35 has a width of between 2 and 4 mm. A portion of the flange 35 is enlarged to form a handle 24 by which the outer member 2 may be held. The handle 24 is provided with an upturned rim 25 to improve grip.

The outer member 2 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may be opaque, transparent or translucent. The manufacturing process may be injection moulding.

The inner member 3 as shown in FIGS. 7 to 10, comprises an annular frame 41 and a downwardly extending cylindrical funnel 40. A major axis X passes through the centre of the inner member 3 as shown in FIG. 7.

As best shown in FIG. 8, the annular frame 41 comprises an outer rim 51 and an inner hub 52 joined by ten equi-spaced radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 4 may also be treated or coated with a material which is activated by heat and/or pressure so that it can be sealed to the annular frame 41 in this way.

As shown in the cross-sectional profile of FIG. 7, the inner hub 52 is located at a lower position than the outer rim 51, resulting in the annular frame 41 having a sloping lower profile.

The upper surface of each spoke 53 is provided with an upstanding web 54 which divides a void space above the annular frame 41 into a plurality of passages 57. Each passage 57 is bounded on either side by a web 54 and on a lower face by the filter 4. The passages 57 extend from the outer rim 51 downwardly towards, and open into, the cylindrical funnel 40 at openings 56 defined by the inner extremities of the webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with the openings 56 of the passages 57 and an outlet 44 at a lower end through which the prepared beverage is discharged into a cup or other receptacle. The discharge spout 43 comprises a frusto-conical portion 48 at an upper end and a cylindrical portion 58 at a lower end. The cylindrical portion 58 may have a slight taper such that it narrows towards the outlet 44. The frusto-conical portion 48 helps to channel beverage from the passages 57 down towards the outlet 44 without inducing turbulence to the beverage. An upper surface of the frusto-conical portion 48 is provided with four support webs 49 equi-spaced around the circumference of the cylindrical funnel 40. The support webs 49 define channels 50 therebetween. The upper edges of the support webs 49 are level with one another and perpendicular to the major axis X.

The inner member 3 may be formed as a single integral piece from polypropylene or a similar material as described above and by injection moulding in the same manner as the outer member 2.

Alternatively, the inner member 3 and/or the outer member 2 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minnesota, USA), starch-based polymers, cellulose derivatives and polypeptides.

The laminate 5 is formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate is particularly advantageous as it has a high resistance to curling during assembly. As a result the laminate 5 may be pre-cut to the correct size and shape and subsequently transferred to the assembly station on the production line without undergoing distortion. Consequently, the laminate 5 is particularly well suited to welding. Other laminate materials may be used including PET/Aluminium/PP, PE/EVOH/PP, PET/metallised/PP and Aluminium/PP laminates. Roll laminate stock may be used instead of die cut stock.

Assembly of the cartridge 1 involves the following steps:
a) the inner member 3 is inserted into the outer member 2;
b) the filter 4 is cut to shape and placed onto the inner member 3 so to be received over the cylindrical funnel 40 and come to rest against the annular frame 41;
c) the inner member 3, outer member 2 and filter 4 are joined by ultrasonic welding;
d) the cartridge 1 is filled with one or more beverage ingredients;
e) the laminate 5 is affixed to the outer member 2.

These steps will be discussed in greater detail below.

The outer member 2 is orientated with the open bottom 12 directed upwards. The inner member 3 is then inserted into the outer member 2 with the outer rim 51 being received as a loose fit in an axial extension 14 at top 11 of the cartridge 1. The cylindrical extension 18 of the outer member 2 is at the same time received in the upper portion of the cylindrical funnel 40 of the inner member 3. The third portion 21 of the cylindrical extension 18 is seated inside the cylindrical funnel 40 with the closed lower face 31 of the cylindrical extension 18 bearing against the support webs 49 of the inner member 3. The filter 4 is then placed over the inner member 3 such that the filter material contacts the annular rim 51. An ultrasonic welding process is then used to join the filter 4 to the inner member 3 and at the same time, and in the same process step, the inner member 3 to the outer member 2. The inner member 3 and filter 4 are welded around the outer rim 51. The inner member 3 and outer member 2 are joined by means of weld lines around the outer rim 51 and also the upper edges of the webs 54.

As shown most clearly in FIG. 11, the outer member 2 and inner member 3 when joined together define a void space 130 in the interior 120 below the annular flange 41 and exterior the cylindrical funnel 40 which forms a filtration chamber. The filtration chamber 130 and passages 57 above the annular frame 41 are separated by the filter paper 4.

The filtration chamber 130 contains the one or more beverage ingredients 200. The one or more beverage ingredients are packed into the filtration chamber 130. For a filtered style beverage the ingredient is typically roast and ground coffee or leaf tea. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm. Optionally, the interior 120 may contain one or more bodies, such as spheres, which are freely movable within the interior 120 to aid mixing by inducing turbulence and breaking down deposits of beverage ingredients during discharge of the beverage.

The laminate 5 is then affixed to the outer member 2 by forming a weld 126 around the periphery of the laminate 5 to join the laminate 5 to the lower surface of the outwardly extending flange 35. The weld 126 is extended to seal the laminate 5 against the lower edge of the cylindrical wall 27 of the inlet chamber 26. Further, a weld 125 is formed between the laminate 5 and the lower edge of the outer tube 42 of the cylindrical funnel 40. The laminate 5 forms the lower wall of the filtration chamber 130 and also seals the inlet chamber 26 and cylindrical funnel 40. However, a small gap 123 exists prior to dispensation between the laminate 5 and the lower edge of the discharge spout 43. A variety of welding methods may be used, such as heat and ultrasonic welding, depending on the material characteristics of the laminate 5.

Advantageously, the inner member 3 spans between the outer member 2 and the laminate 5. The inner member 3 is formed from a material of relative rigidity, such as polypropylene. As such, the inner member 3 forms a load-bearing member that acts to keep the laminate 5 and outer member 2 spaced apart when the cartridge 1 is compressed. It is preferred that the cartridge 1 is subjected to a compressive load of between 130 and 280 N in use. The compressive force acts to prevent the cartridge failing under internal pressurisation and also serves to squeeze the inner member 3 and outer member 2 together. This ensures that the internal dimensions of passageways and apertures in the cartridge 1 are fixed and unable to change during pressurisation of the cartridge 1.

To use the cartridge 1 it is first inserted into a beverage preparation machine (which will be described in further detail below) and the inlet 121 and outlet 122 are opened by piercing members of the beverage preparation machine which perforate and fold back the laminate 5. An aqueous medium, typically water, under pressure enters the cartridge 1 through the inlet 121 into the inlet chamber 26 at a pressure of between 0.1–2.0 bar. From there the water is directed to flow through the slots 30 and round the manifold 16 and into the filtration chamber 130 of the cartridge 1 through the plurality of slots 17. The water is forced radially inwardly through the filtration chamber 130 and mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41. The sealing of the filter 4 onto the spokes 53 and the welding of the rim 51 with the outer member 2 ensures that there are no short-circuits and all the beverage has to pass through the filter 4.

The beverage then flows downwardly along the radial passages 57 formed between the webs 54 and through the openings 56 and into the cylindrical funnel 40. The beverage passes along the channels 50 between the support webs 47 and down the discharge spout 43 to the outlet 44 where the beverage is discharged into a receptacle such as a cup.

Preferably, the beverage preparation machine comprises an air purge facility, wherein compressed air is forced through the cartridge 1 at the end of the dispense cycle to flush out the remaining beverage into the receptacle.

A second version of cartridge 1 is shown in FIGS. 12 to 18. The second version of the cartridge 1 is particularly designed for use in dispensing espresso-style products such as roast and ground coffee where it is desirable to produce a beverage having a froth of tiny bubbles known as a crema. Many of the features of the second version of the cartridge 1 are the same as in the first version and like numerals have been used to reference like features. In the following description the differences between the first and second versions will be discussed. Common features which function in the same manner will not be discussed in detail.

The outer member 2 is of the same construction as in the first version of cartridge 1 and as shown in FIGS. 1 to 6.

Figure 16:
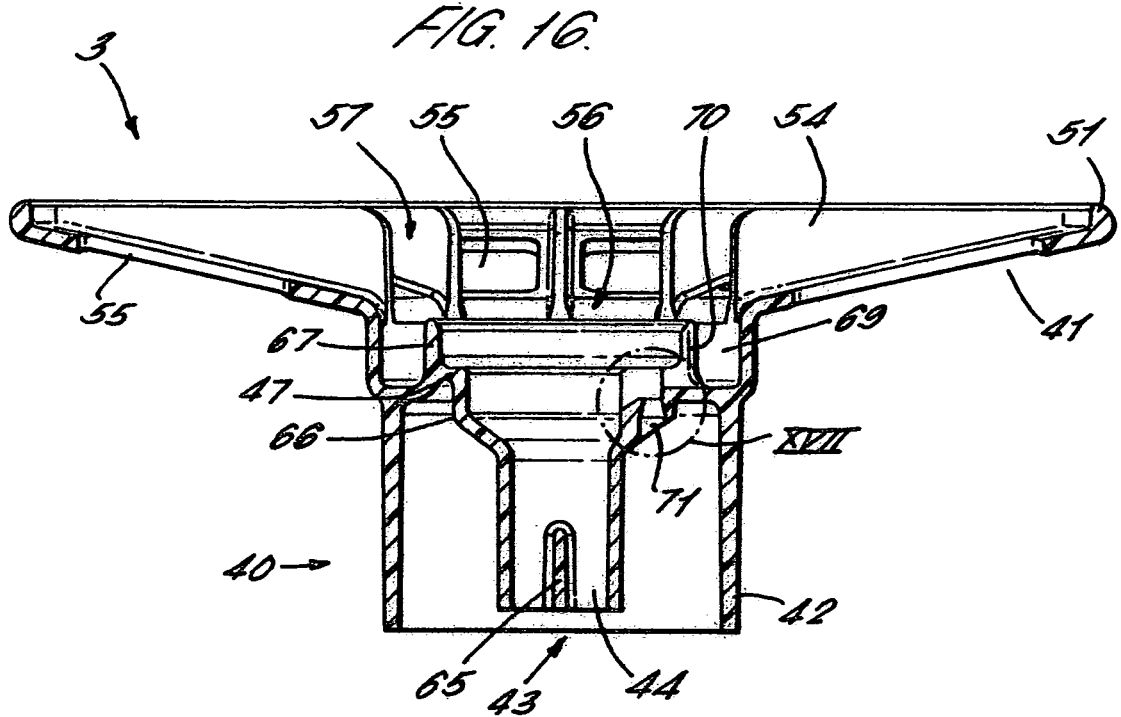
FIG. 16 is another cross-sectional drawing of the inner member of FIG. 12.

The annular frame 41 of the inner member 3 is the same as in the first version. Also, a filter 4 is disposed on the annular frame 41 so as to cover the filtration apertures 55. The outer tube 42 of the cylindrical funnel 40 is also as before. However, there are a number of differences in the construction of the inner member 2 of the second version compared to the first version. As shown in FIG. 16, the discharge spout 43 is provided with a partition 65 which extends part way up the discharge spout 43 from the outlet 44. The partition 65 helps to prevent the beverage spraying and/or splashing as it exits the discharge spout 43. The profile of the discharge spout 43 is also different and comprises a stepped profile with a distinct dog-leg 66 near an upper end of the tube 43.

A rim 67 is provided upstanding from the annular flange 47 joining the outer tube 42 to the discharge spout 43. The rim 67 surrounds the inlet 45 to the discharge spout 43 and defines an annular channel 69 between the rim 67 and the upper portion of the outer tube 42. The rim 67 is provided with an inwardly directed shoulder 68. At one point around the circumference of the rim 67 an aperture 70 is provided in the form of a slot which extends from an upper edge of rim 67 to a point marginally below the level of the shoulder 68 as most clearly shown in FIGS. 12 and 13. The slot has a width of 0.64 mm.

Figure 17:
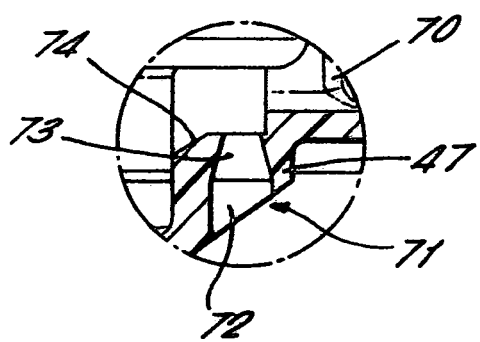
FIG. 17 is a cross-sectional drawing of another detail of the inner member of FIG. 12 showing an air inlet.

An air inlet 71 is provided in annular flange 47 circumferentially aligned with the aperture 70 as shown in FIGS. 16 and 17. The air inlet 71 comprises an aperture passing through the flange 47 so as to provide communication between a point above the flange 47 and the void space below the flange 47 between the outer tube 42 and discharge spout 43. Preferably, and as shown, the air inlet 71 comprises an upper frusto-conical portion 73 and a lower cylindrical portion 72. The air inlet 71 is typically formed by a mould tool such as a pin. The tapered profile of the air inlet 71 allows the mould tool to be more easily removed from the moulded component. The wall of the outer tube 42 in the vicinity of the air inlet 71 is shaped to form a chute 75 leading from the air inlet 71 to the inlet 45 of the discharge spout 43. As shown in FIG. 17, a canted shoulder 74 is formed between the air inlet 71 and the chute 75 to ensure that the jet of beverage issuing from the slot 70 does not immediately foul on the upper surface of the flange 47 in the immediate vicinity of the air inlet 71.

Figure 18:
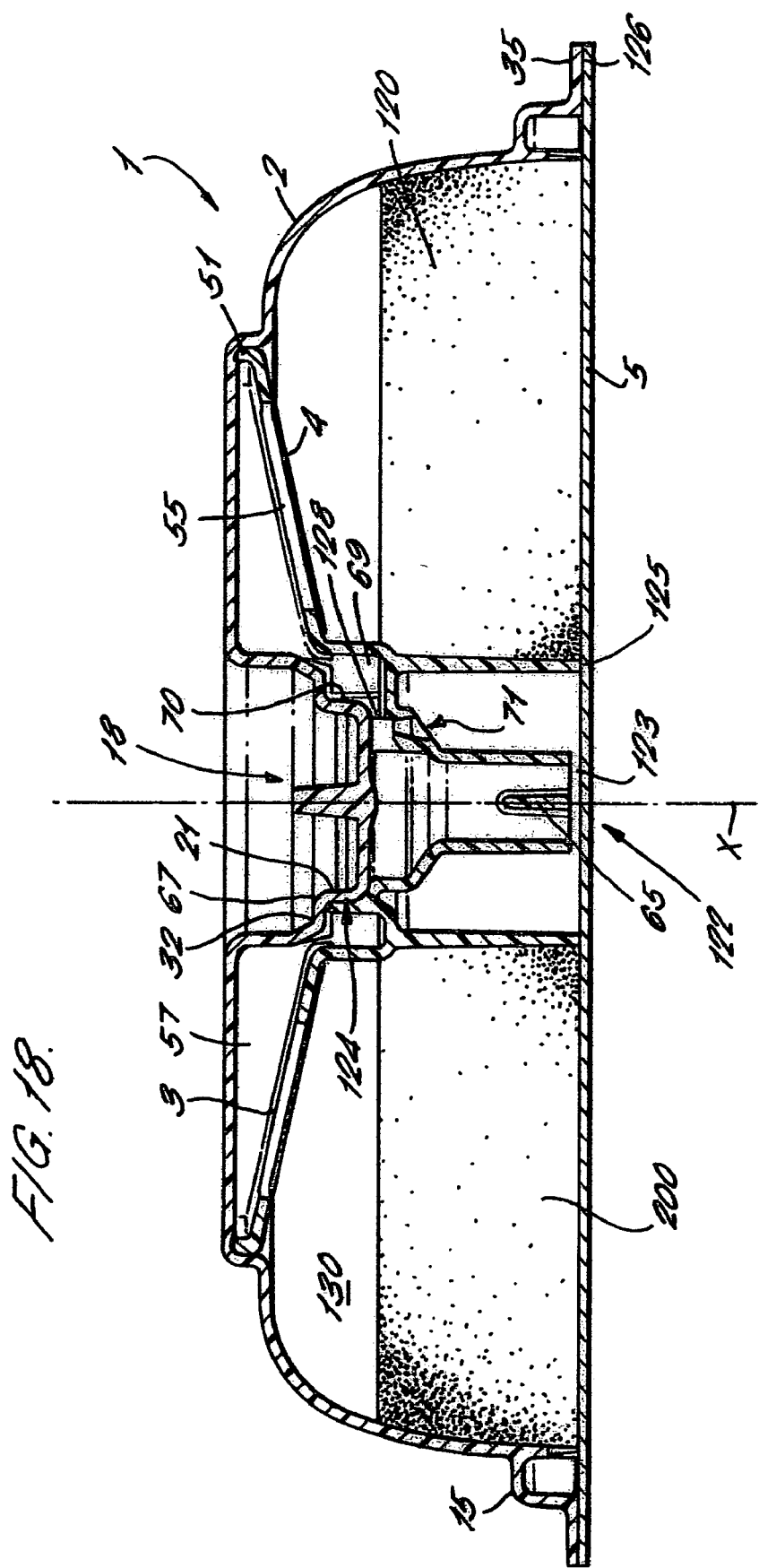
FIG. 18 is a cross-sectional drawing of the second embodiment of cartridge in an assembled condition.
Figure 21:
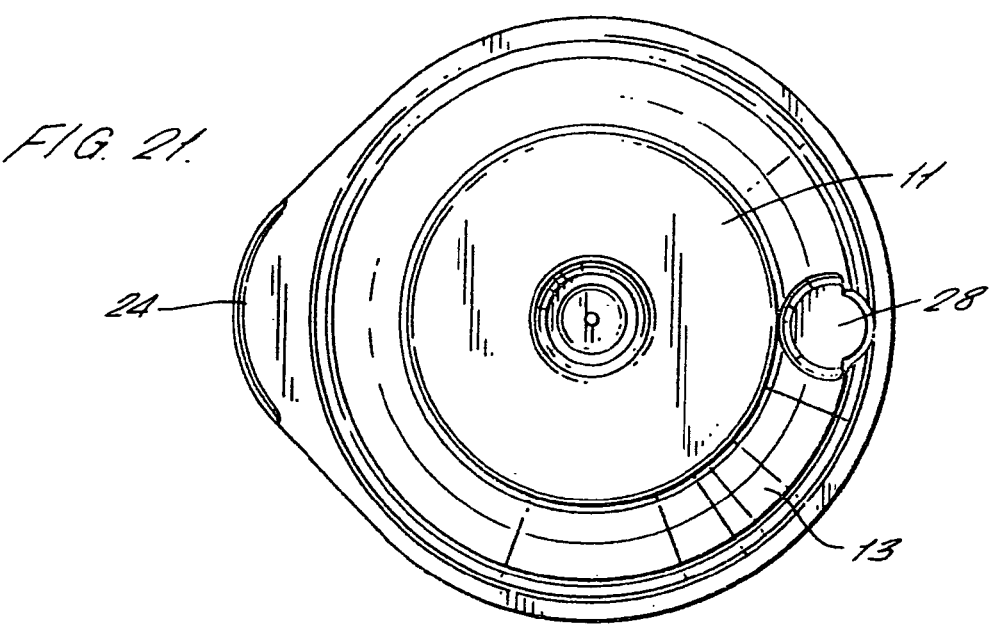
FIG. 21 is a plan view from above of the outer member of FIG. 19.
Figure 22:
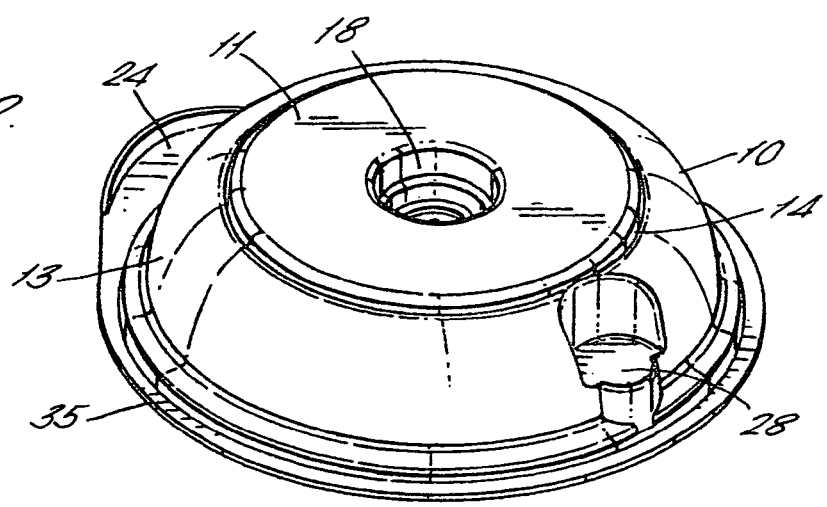
FIG. 22 is a perspective view from above of the outer member of FIG. 19.

The assembly procedure for the second version of cartridge 1 is similar to the assembly of the first version. However, there are certain differences. As shown in FIG. 18, the third portion 21 of the cylindrical extension 18 is seated inside the support rim 67 rather than against support webs. The shoulder 32 of the cylindrical extension 18 between the second portion 20 and third portion 21 bears against the upper edge of the support rim 67 of the inner member 3. An interface zone 124 is thus formed between the inner member 3 and the outer member 2 comprising a face seal between the cylindrical extension 18 and the support rim 67 which extends around nearly the whole circumference of the cartridge 1. The seal between the cylindrical extension 18 and the support rim 67 is not fluid-tight though since the slot 70 in the support rim 67 extends through the support rim 67 and downwardly to a point marginally below the shoulder 68. Consequently the interface fit between the cylindrical extension 18 and the support rim 67 transforms the slot 70 into an aperture 128, as most clearly shown in FIG. 18, providing gas and liquid communication between the annular channel 69 and the discharge spout 43. The aperture is typically 0.64 mm wide by 0.69 mm long.

Operation of the second version of cartridge 1 to dispense a beverage is similar to the operation of the first version but with certain differences. Beverage in the radial passages 57 flows downwardly along the passages 57 formed between the webs 54 and through the openings 56 and into the annular channel 69 of the cylindrical funnel 40. From the annular channel 69 the beverage is forced under pressure through the aperture 128 by the back pressure of beverage collecting in the filtration chamber 130 and passages 57. The beverage is thus forced through aperture 128 as a jet and into an expansion chamber formed by the upper end of the discharge spout 43. As shown in FIG. 18, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired crema. Thus, the aperture 128 and the air inlet 71 together form an eductor which acts to entrain air into the beverage. Flow of beverage into the eductor should be kept as smooth as possible to reduce pressure losses. Advantageously, the walls of the eductor should be made concave to reduce losses due to 'wall effect' friction. The dimensional tolerance of the aperture 128 is small. Preferably the aperture size is fixed plus or minus 0.02 mm$^2$. Hairs, fibrils or other surface irregularities can be provided within or at the exit of the eductor to increase the effective cross-sectional area which has been found to increase the degree of air entrainment.

A third version of cartridge 1 is shown in FIGS. 19 to 29. The third version of the cartridge 1 is particularly designed for use in dispensing soluble products which may be in powdered, liquid, syrup, gel or similar form. The soluble product is dissolved by or forms a suspension in, an aqueous medium such as water when the aqueous medium is passed, in use, through the cartridge 1. Examples of beverages include chocolate, coffee, milk, tea, soup or other rehydratable or aqueous-soluble products. Many of the features of the third version of the cartridge 1 are the same as in the previous versions and like numerals have been used to reference like features. In the following description the differences between the third and previous versions will be discussed. Common features which function in the same manner will not be discussed in detail.

Compared to the outer member 2 of the previous versions, the hollow inwardly directed cylindrical extension 18 of the outer member 2 of the third version has a larger overall diameter as shown in FIG. 20. In particular the diameter of the first portion 19 is typically between 16 and 18 mm compared to 13.2 mm for the outer member 2 of the previous versions. In addition, the first portion 19 is provided with a convex outer surface 19*a*, or bulge, as most clearly shown in FIG. 20, the function of which will be described below. The diameter of the third portions 21 of the cartridges 1 are however the same resulting in the area of the shoulder 32 being greater in this, the third version of the cartridge 1. Typically the volume of the cartridge 1 when assembled is 32.5 ml±20%.

Figure 23:
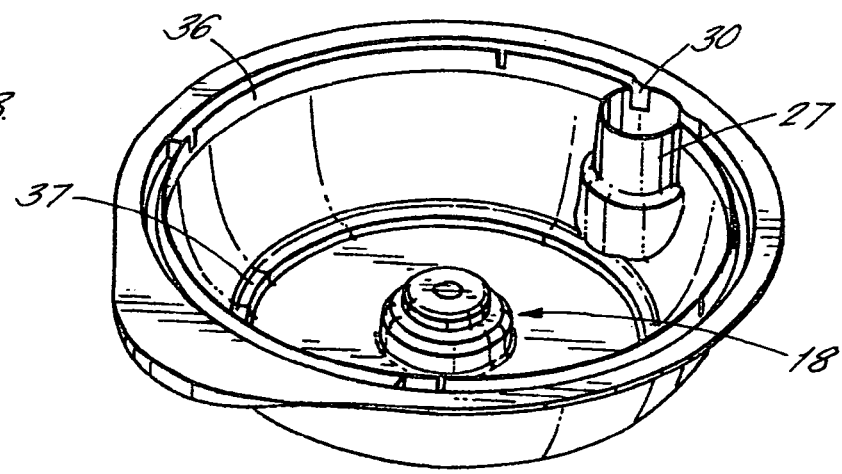
FIG. 23 is a perspective view from above of the outer member of FIG. 19 in an inverted orientation.

The number and positioning of the slots in the lower end of the annular wall 13 is also different. Between 3 and 5 slots are provided. In the embodiment as shown in FIG. 23, four slots 36 are provided equi-spaced around the circumference of the manifold 16. The slots 36 are slightly wider than in the previous versions of the cartridge 1 being between 0.35 and 0.45 mm, preferably 0.4 mm wide.

In other respects the outer members 2 of the cartridges 1 are the same.

The construction of the cylindrical funnel 40 of the inner member 3 is the same as in the first version of cartridge 1 with an outer tube 42, discharge spout 45, annular flange 47 and support webs 49 being provided. The only difference is that the discharge spout 45 is shaped with an upper frusto-conical section 92 and a lower cylindrical section 93.

In contrast to the previous versions and as shown in FIGS. 24 to 28, the annular frame 41 is replaced by a skirt portion 80 which surrounds the cylindrical funnel 40 and is joined thereto by means of eight radial struts 87 which adjoin the cylindrical funnel 40 at or near the annular flange 47. A cylindrical extension 81 of the skirt portion 80 extends upwardly from the struts 87 to define a chamber 90 with an open upper face. An upper rim 91 of the cylindrical extension 81 has an in-turned profile as shown in FIG. 26. An annular wall 82 of the skirt portion 80 extends downwardly from the struts 87 to define an annular channel 86 between the skirt portion 80 and the outer tube 42.

The annular wall 82 comprises at a lower end an exterior flange 83 which lies perpendicular to the major axis X. A rim 84 depends downwardly from a lower surface of the flange 83 and contains five apertures 85 which are circumferentially equi-spaced around the rim 84. Thus, the rim 84 is provided with a castellated lower profile.

Apertures 89 are provided between the struts 87 allowing communication between the chamber 90 and the annular channel 86.

Figure 29:
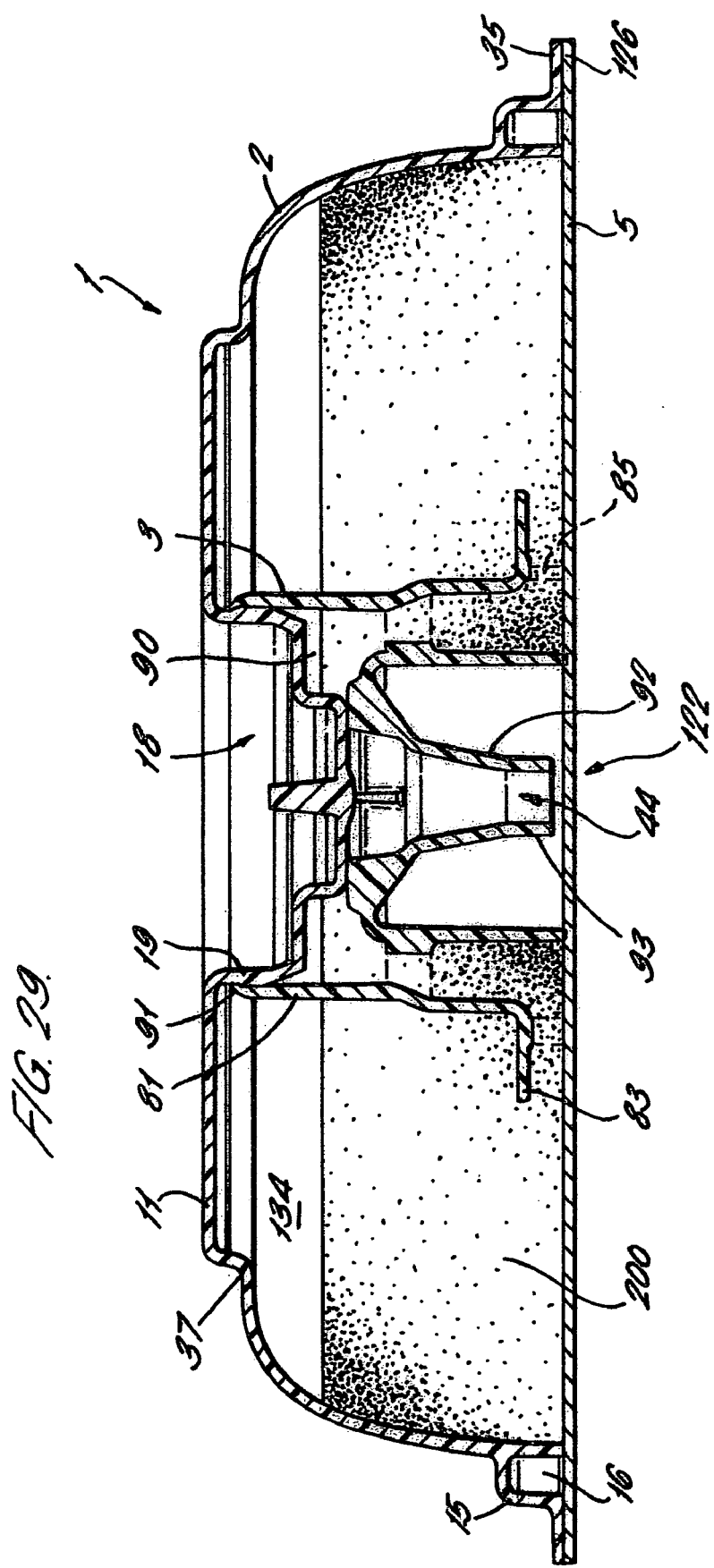
FIG. 29 is a cross-sectional drawing of the third embodiment of cartridge in an assembled condition.

The assembly procedure for the third version of cartridge 1 is similar to the assembly of the first version but with certain differences. The outer member 2 and inner member 3 are push-fitted together as shown in FIG. 29 and retained by means of a snap-fit arrangement rather than welded together. On joining the two members the inwardly directed cylindrical extension 18 is received inside the upper cylindrical extension 81 of the skirt portion 80. The inner member 3 is retained in the outer member 2 by frictional interengagement of the convex outer surface 19a of the first portion 19 of the cylindrical extension 18 with the in-turned rim 91 of the upper cylindrical extension 81. With the inner member 3 located in the outer member 2 a mixing chamber 134 is defined located exterior to the skirt portion 80. The mixing chamber 134 contains the beverage ingredients 200 prior to dispensation. It should be noted that the four inlets 36 and the five apertures 85 are staggered circumferentially with respect to one another. The radial location of the two parts relative to each other need not be determined or fixed during assembly since the use of four inlets 36 and five apertures 85 ensures that misalignment occurs between the inlets and apertures whatever the relative rotational positioning of the components.

The one or more beverage ingredients are packed into the mixing chamber 134 of the cartridge. The density of packing of the beverage ingredients in the mixing chamber 134 can be varied as desired.

The laminate 5 is then affixed to the outer member 2 and inner member 3 in the same manner as described above in the previous versions.

In use, water enters the mixing chamber 134 through the four slots 36 in the same manner as previous versions of the cartridge. The water is forced radially inwardly through the mixing chamber and mixes with the beverage ingredients contained therein. The product is dissolved or mixed in the water and forms the beverage in the mixing chamber 134 and is then driven though the apertures 85 into the annular channel 86 by back pressure of beverage and water in the mixing chamber 134. The circumferential staggering of the four inlet slots 36 and the five apertures 85 ensures that jets of water are not able to pass radially directly from the inlet slots 36 to the apertures 85 without first circulating within the mixing chamber 134. In this way the degree and consistency of dissolution or mixing of the product is significantly increased. The beverage is forced upwardly in the annular channel 86, through the apertures 89 between the struts 87 and into the chamber 90. The beverage passes from chamber 90 through the inlets 45 between the support webs 49 into the discharge spout 43 and towards the outlet 44 where the beverage is discharged into a receptacle such as a cup. The cartridge finds particular application with beverage ingredients in the form of viscous liquids or gels. In one application a liquid chocolate ingredient is contained in the cartridge 1 with a viscosity of between 1700 and 3900 mPa at ambient temperature and between 5000 and 10000 mPa at 0° C. and a refractive solids of 67 Brix±3. In another application liquid coffee is contained in the cartridge 1 with a viscosity of between 70 and 2000 mPa at ambient and between 80 and 5000 mPa at 0° C. where the coffee has a total solids level of between 40 and 70%.

A fourth version of cartridge 1 is shown in FIGS. 30 to 34. The fourth version of the cartridge 1 is particularly designed for use in dispensing liquid products such as concentrated liquid milk. Many of the features of the fourth version of the cartridge 1 are the same as in the previous versions and like numerals have been used to reference like features. In the following description the differences between the fourth and previous versions will be discussed. Common features which function in the same manner will not be discussed in detail.

The outer member 2 is the same as in the third version of cartridge 1 and as shown in FIGS. 19 to 23.

The cylindrical funnel 40 of the inner member 3 is similar to that shown in the second version of cartridge 1 but with certain differences. As shown in FIG. 30 the discharge spout 43 is shaped with an upper frusto-conical section 106 and a lower cylindrical section 107. Three axial ribs 105 are provided on the inner surface of the discharge spout 43 to direct the dispensed beverage downwards towards the outlet 44 and prevent the discharged beverage from spinning within the spout. Consequently, the ribs 105 act as baffles. As in the second version of cartridge 1, an air inlet 71 is provided through the annular flange 47. However, the chute 75 beneath the air inlet 71 is more elongated than in the second version.

A skirt portion 80 is provided similar to that shown in the third version of the cartridge 1 described above. Between 5 and 12 apertures 85 are provided in the rim 84. Typically ten apertures are provided rather than the five provided in the third version of cartridge 1.

An annular bowl 100 is provided extending from and integral with the flange 83 of the skirt portion 80. The annular bowl 100 comprises a flared body 101 with an open upper mouth 104 which is directed upwards. Four feed apertures 103 shown in FIGS. 30 and 31 are located in the body 101 at or near the lower end of the bowl 100 where it joins the skirt portion 80. Preferably, the feed apertures are equi-spaced around the circumference of the bowl 100.

The laminate 5 is of the type described above in the previous embodiments.

The assembly procedure for the fourth version of cartridge 1 is the same as that for the third version.

Figure 34:
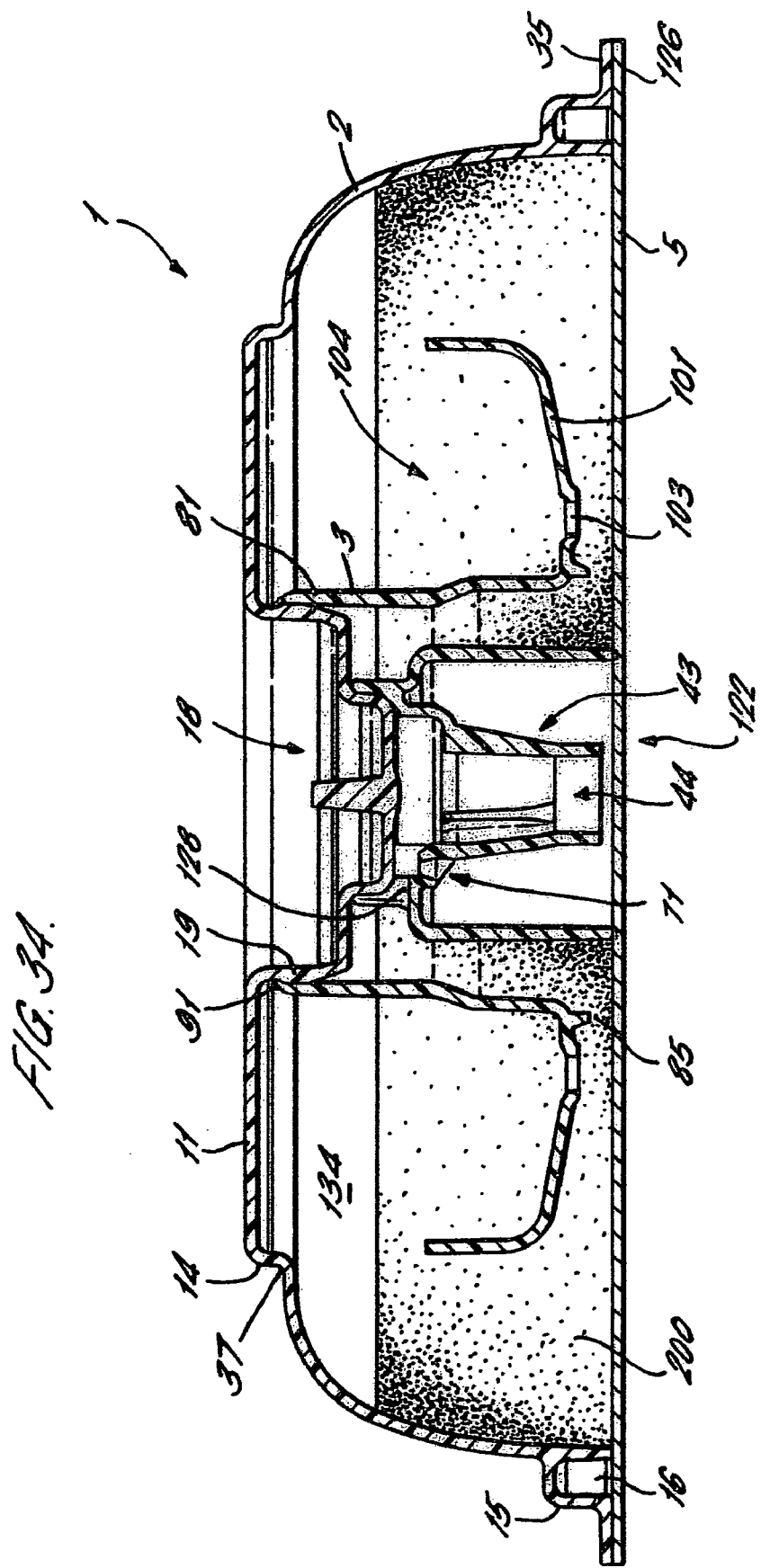
FIG. 34 is a cross-sectional drawing of the fourth embodiment of cartridge in an assembled condition.

Operation of the fourth version of cartridge is similar to that of the third version. The water enters the cartridge 1 and the mixing chamber 134 in the same manner as before. There the water mixes with and dilutes the liquid product which is then forced out through the apertures 85 towards the outlet 44 as described above. A proportion of the liquid product is initially contained within the annular bowl 100 as shown in FIG. 34 and is not subject to immediate dilution by the water entering the mixing chamber 134. The diluted liquid product in the lower part of the mixing chamber 134 will tend to exit through apertures 85 rather than be forced up and into the annular bowl 100 through upper mouth 104. Consequently, the liquid product in the annular bowl 100 will remain relatively concentrated compared to the product in the lower part of the mixing chamber 134. The liquid product in the annular bowl 100 drips through the feed apertures 103 into the stream of product exiting the mixing chamber 134 through the apertures 85. The annular bowl 100 acts to even out the concentration of the diluted liquid product entering the cylindrical funnel 40 by holding back a proportion of the concentrated liquid product and releasing it into the exiting liquid stream more steadily throughout the dispensation cycle.

From the annular channel 86 the beverage is forced under pressure through the aperture 128 by the back pressure of beverage collecting in the filtration chamber 134 and chamber 90. The beverage is thus forced through aperture 128 as a jet and into an expansion chamber formed by the upper end of the discharge spout 43. As shown in FIG. 34, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired frothy appearance.

Advantageously, the inner member 3, outer member 2, laminate 5 and filter 4 can all be readily sterilised due to the components being separable and not individually comprising tortuous passageways or narrow crevices. Rather, it is only after conjoining the components, after sterilisation, that the necessary passageways are formed. This is particularly important where the beverage ingredient is a dairy-based product such as liquid milk concentrate.

The fourth embodiment of beverage cartridge is particularly advantageous for dispensing a concentrated dairy-based liquid product such as liquid milk. Previously, powdered milk products have been provided in the form of sachets for adding to a pre-prepared beverage. However, for a cappuccino-style beverage it is necessary to foam the milk. This has been achieved previously by passing steam through a liquid milk product. However this necessitates the provision of a steam supply which increases the cost and complexity of the machine used to dispense the beverage. The use of steam also increases the risk of injury during operation of the cartridge. The beverage cartridge may have a concentrated dairy-based liquid product therein. It has been found that by concentrating the milk product a greater amount of foam can be produced for a particular volume of milk when compared to fresh or UHT milk. This reduces the size required for the milk cartridge. Fresh semi-skimmed milk contains approximately 1.6% fat and 10% total solids. The concentrated liquid milk preparations of the present invention contain between 3 and 10% fat and 25 to 40% total solids. In a typical example, the preparation contains 4% fat and 30% total solids. The concentrated milk preparations are suitable for foaming using a low pressure preparation machine as will be described below. In particular, foaming of the milk is achieved at pressures below 2 bar, preferably approximately 1.5 bar using the cartridge of the fourth embodiment described above.

The cartridge of the fourth embodiment is also advantageous in dispensing liquid coffee products.

It has been found that the embodiments of beverage cartridge of the present invention advantageously provide an improved consistency of the brewed beverage when compared to prior art cartridges. Reference is made to Table 1 below which shows the results of brew yields for twenty samples each of cartridges A and B containing roast and ground coffee. Cartridge A is a beverage cartridge according to the first embodiment of the present invention. Cartridge B is a prior art beverage cartridge as described in the applicant's document WO01/58786. The refractive index of the brewed beverage is measured in Brix units and converted to a percentage of soluble solids (% SS) using standard tables and formulae. In the examples below:

% $SS = 0.7774*$(Brix value)$+0.0569$.

% Yield=(% $SS$*Brew Volume (g))/(100*Coffee Weight (g))

TABLE 1

| Sample | Brew Volume (g) | Coffee Weight (g) | Brix | % SS (*) | % Yield |
|---|---|---|---|---|---|
| CARTRIDGE A | | | | | |
| 1 | 105.6 | 6.5 | 1.58 | 1.29 | 20.88 |
| 2 | 104.24 | 6.5 | 1.64 | 1.33 | 21.36 |
| 3 | 100.95 | 6.5 | 1.67 | 1.36 | 21.05 |
| 4 | 102.23 | 6.5 | 1.71 | 1.39 | 21.80 |
| 5 | 100.49 | 6.5 | 1.73 | 1.40 | 21.67 |
| 6 | 107.54 | 6.5 | 1.59 | 1.29 | 21.39 |
| 7 | 102.70 | 6.5 | 1.67 | 1.36 | 21.41 |
| 8 | 97.77 | 6.5 | 1.86 | 1.50 | 22.61 |
| 9 | 97.82 | 6.5 | 1.7 | 1.38 | 20.75 |
| 10 | 97.83 | 6.5 | 1.67 | 1.36 | 20.40 |
| 11 | 97.6 | 6.5 | 1.78 | 1.44 | 21.63 |
| 12 | 106.64 | 6.5 | 1.61 | 1.31 | 21.47 |
| 13 | 99.26 | 6.5 | 1.54 | 1.25 | 19.15 |
| 14 | 97.29 | 6.5 | 1.59 | 1.29 | 19.35 |
| 15 | 101.54 | 6.5 | 1.51 | 1.23 | 19.23 |
| 16 | 104.23 | 6.5 | 1.61 | 1.31 | 20.98 |
| 17 | 97.5 | 6.5 | 1.73 | 1.40 | 21.03 |
| 18 | 100.83 | 6.5 | 1.68 | 1.36 | 21.14 |
| 19 | 101.67 | 6.5 | 1.67 | 1.36 | 21.20 |
| 20 | 101.32 | 6.5 | 1.68 | 1.36 | 21.24 |
| | | | | AVERAGE | 20.99 |
| CARTRIDGE B | | | | | |
| 1 | 100.65 | 6.5 | 1.87 | 1.511 | 23.39 |
| 2 | 95.85 | 6.5 | 1.86 | 1.503 | 22.16 |
| 3 | 98.4 | 6.5 | 1.8 | 1.456 | 22.04 |
| 4 | 92.43 | 6.5 | 2.3 | 1.845 | 26.23 |
| 5 | 100.26 | 6.5 | 1.72 | 1.394 | 21.50 |
| 6 | 98.05 | 6.5 | 2.05 | 1.651 | 24.90 |
| 7 | 99.49 | 6.5 | 1.96 | 1.581 | 24.19 |
| 8 | 95.62 | 6.5 | 2.3 | 1.845 | 27.14 |
| 9 | 94.28 | 6.5 | 2.17 | 1.744 | 25.29 |

TABLE 1-continued

| Sample | Brew Volume (g) | Coffee Weight (g) | Brix | % SS (*) | % Yield |
|---|---|---|---|---|---|
| 10 | 96.13 | 6.5 | 1.72 | 1.394 | 20.62 |
| 11 | 96.86 | 6.5 | 1.81 | 1.464 | 21.82 |
| 12 | 94.03 | 6.5 | 2.2 | 1.767 | 25.56 |
| 13 | 96.28 | 6.5 | 1.78 | 1.441 | 21.34 |
| 14 | 95.85 | 6.5 | 1.95 | 1.573 | 23.19 |
| 15 | 95.36 | 6.5 | 1.88 | 1.518 | 22.28 |
| 16 | 92.73 | 6.5 | 1.89 | 1.526 | 21.77 |
| 17 | 88 | 6.5 | 1.59 | 1.293 | 17.50 |
| 18 | 93.5 | 6.5 | 2.08 | 1.674 | 24.08 |
| 19 | 100.88 | 6.5 | 1.75 | 1.417 | 22.00 |
| 20 | 84.77 | 6.5 | 2.37 | 1.899 | 24.77 |
|  |  |  |  | AVERAGE | 23.09 |

Performing a t-test statistical analysis on the above data gives the following results:

TABLE 2 t-Test: Two-Sample Assuming Equal Variances

|  | % Yield (Cartridge A) | % Yield (Cartridge B) |
|---|---|---|
| Mean | 20.99 | 23.09 |
| Variance | 0.77 | 5.04 |
| Observations | 20 | 20 |
| Pooled Variance | 2.90 |  |
| Hypothesized Mean Difference | 0 |  |
| df | 38 |  |
| t Stat | −3.90 |  |
| P(T <= t) one-tail | 0.000188 |  |
| t Critical one-tail | 1.686 |  |
| P(T <= t) two-tail | 0.000376 |  |
| t Critical two-tail | 2.0244 |  |
| Standard Deviation | 0.876 | 2.245 |

The analysis shows that the consistency of % yield, which equates to brew strength, for the cartridges of the present invention is significantly better (at a 95% confidence level) than the prior art cartridges, with a standard deviation of 0.88% compared to 2.24%. This means that beverages brewed with the cartridges of the present invention have a more repeatable and uniform strength. This is preferred by consumers who like their drinks to taste the same time after time and do not want arbitrary changes in brew strength.

The materials of the cartridges described above may be provided with a barrier coating to improve their resistance to oxygen and/or moisture and/or other contaminant ingress. The barrier coating may also improve the resistance to leakage of the beverage ingredients from within the cartridges and/or reduce the degree of leaching of extractibles from the cartridge materials which might adversely affect the beverage ingredients. The barrier coating may be of a material selected from the group of PET, Polyamide, EVOH, PVDC or a metallised material. The barrier coating may be applied by a number of mechanisms including but not limited to vapour deposition, vacuum deposition, plasma coating, co-extrusion, in-mould labelling and two/multi-stage moulding.

A beverage preparation machine 201 according to the present invention for use with the above described beverage cartridges is shown in FIGS. 35 to 45. The beverage preparation machine 201 generally comprises a housing 210 containing a water tank 220, a water heater 225, a water pump 230, an air compressor 235, a control processor, a user interface 240 and a cartridge head 250. The cartridge head 250 in turn generally comprises a cartridge holder 251 for holding, in use, the beverage cartridge 1, cartridge recognition means 252 and inlet and outlet piercers 253, 254 for forming, in use, the inlet 121 and the outlet 122 in the beverage cartridge 1.

The housing 210 contains and holds in position the other components of the machine 201. The housing 210 preferably made in whole or in part from a robust plastics material such as ABS. Alternatively, the housing 210 can be made in whole or in part from a metallic material such as stainless steel or aluminium. The housing 210 is preferably comprises a clam-shell design having a front half 211 and a rear half 212 which allow access during assembly for fitting of the machine 201 components and can afterwards be joined together to define an interior 213 of the housing 210. The rear half 212 provides a recess 214 for the attachment of the water tank 220. The housing 210 is formed with means, such as detents, abutments, bosses and threaded portions, for retaining the components of the machine 201 in position without the need for a separate chassis. This reduces the overall cost and weight of the machine 201. A base 215 of the housing 210 is preferably provided with feet for standing the machine thereon in a stable manner. Alternatively, the base 215 itself may have a shape forming a stable support.

The front half 211 of the housing 210 comprises a dispense station 270 where dispensation of the beverage takes place. The dispense station 270 comprises a receptacle stand 271 having a hollow interior forming a drip tray 272. An upper surface 273 of the receptacle stand is provided with a grill 274 on which the receptacle is positioned. The drip tray 272 is removable from the housing 210 to ease emptying of the collected water. A recess 275 is formed in the front half of the housing 210 above the receptacle stand 271 to accommodate the dimensions of the receptacle.

Figure 35:
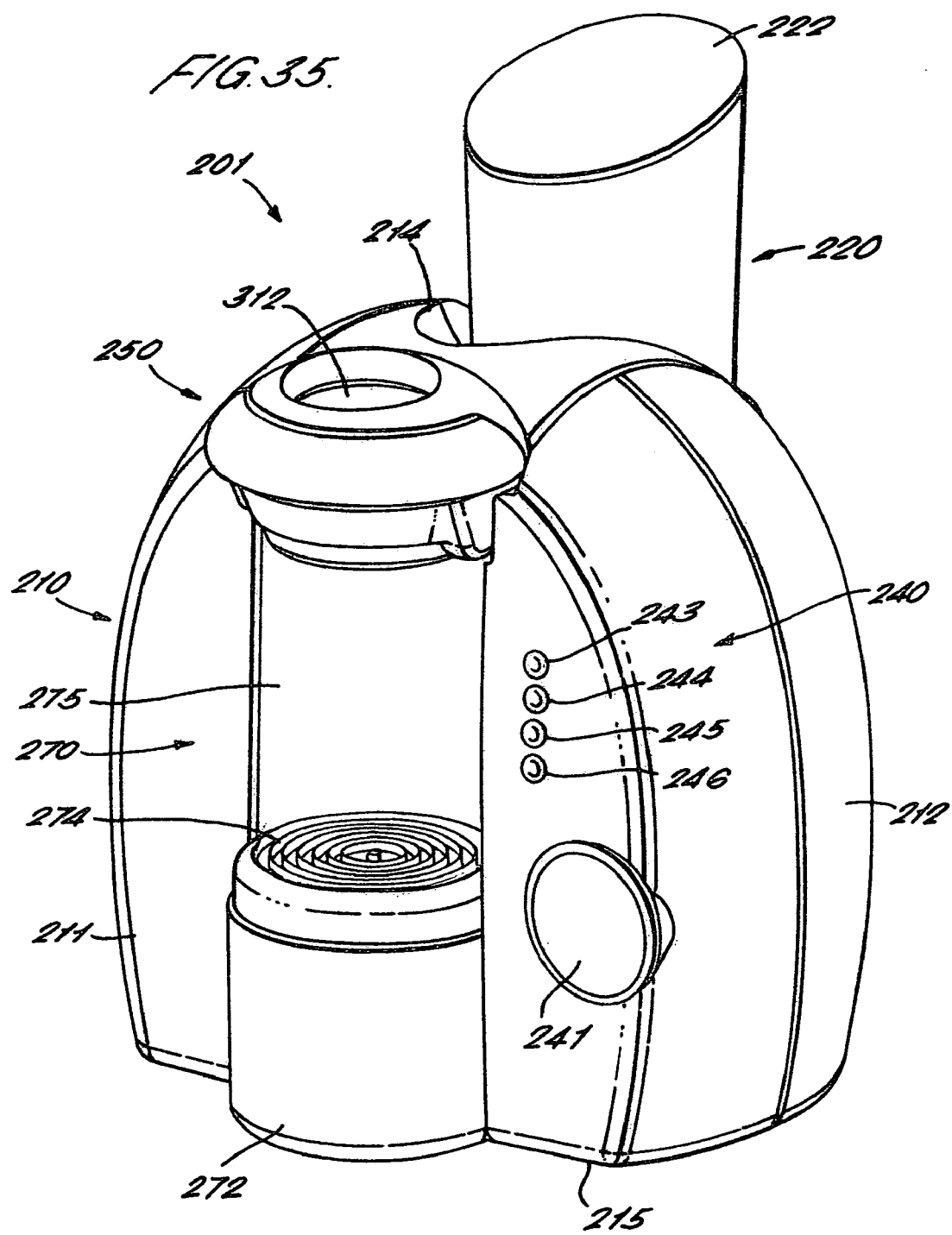
FIG. 35 is a front perspective view of a beverage preparation machine according to the present invention.
Figure 36:
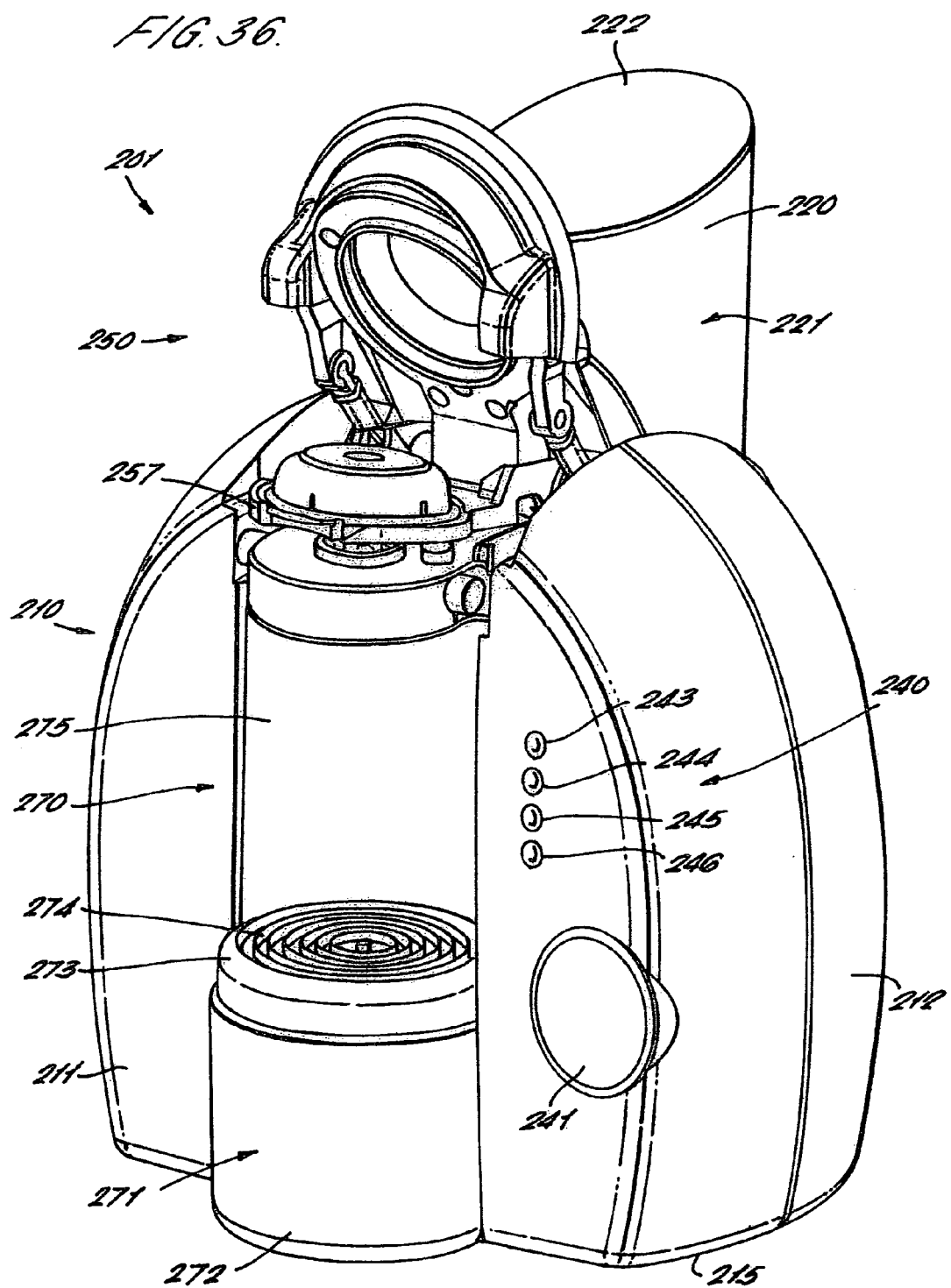
FIG. 36 is a front perspective view of the machine of FIG. 35 with a cartridge head in an open position.
Figure 37:
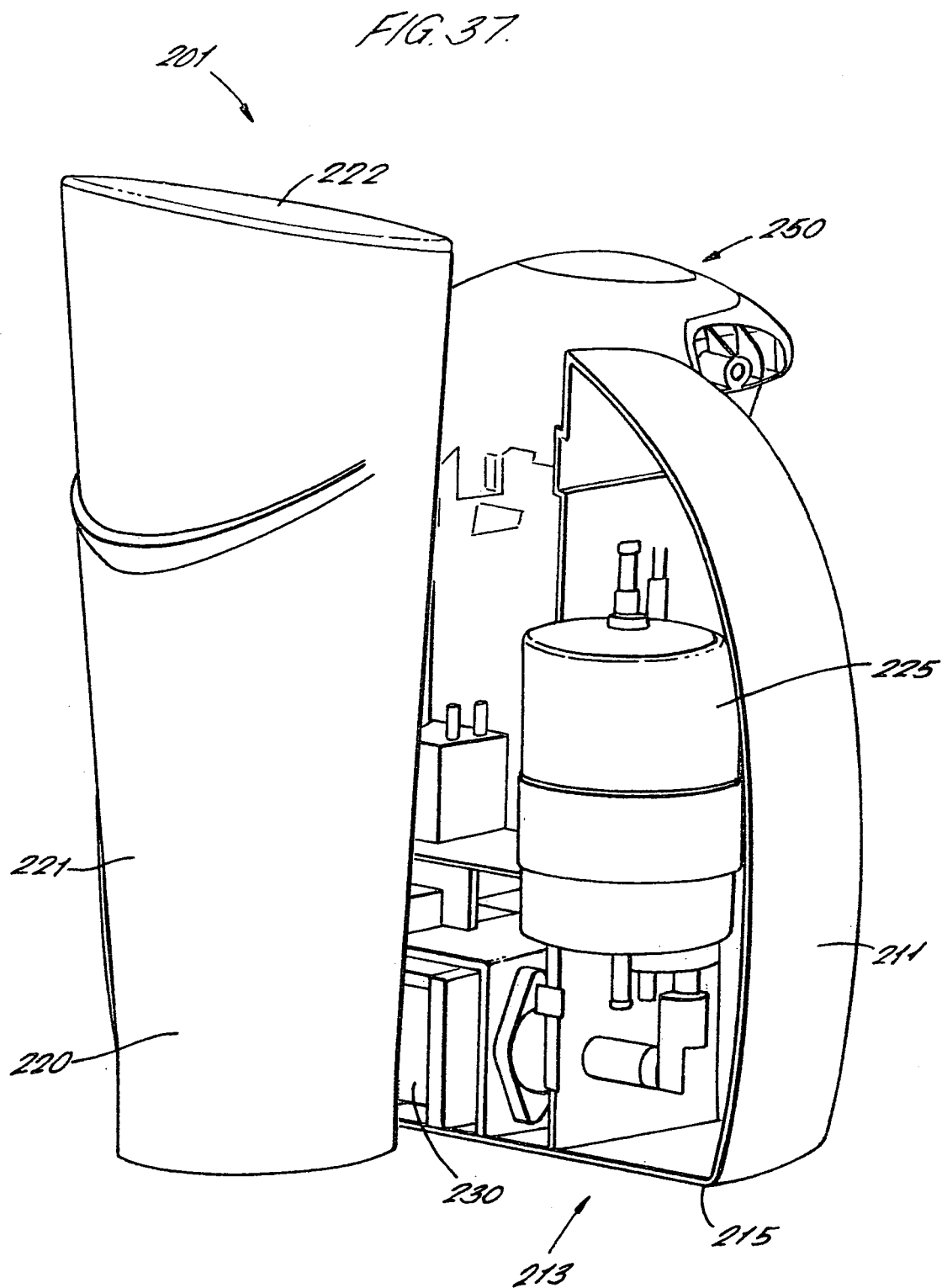
FIG. 37 is a rear perspective view of the machine of FIG. 35 with some parts omitted for clarity.
Figure 38:
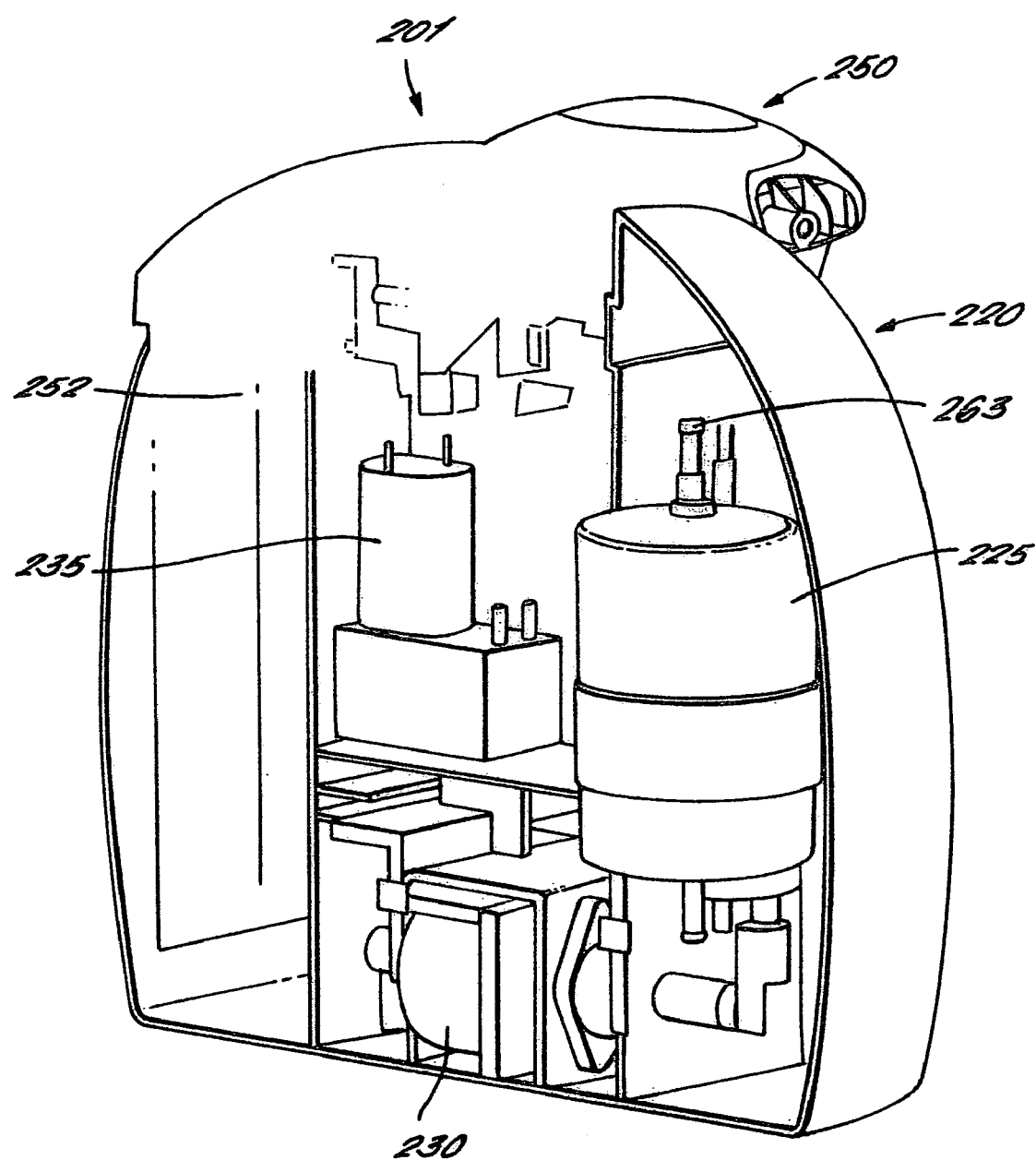
FIG. 38 is another rear perspective view of the machine of FIG. 35 with some parts omitted for clarity.

The cartridge head 250 is located towards the top of the housing 210 above the receptacle stand as shown in FIGS. 35 and 36. Preferably, the height of the grill 274 relative to the cartridge head 250 can be adjusted to accommodate different sizes of receptacle. It is preferred that the receptacle is as close to the cartridge head 250 as possible, whilst still allowing the receptacle to be inserted and withdrawn from the dispense station 270, so as to minimise the height that the dispensed beverage has to descend before contacting the receptacle. This acts to minimise spraying and splashing of the beverage and minimise loss of entrained air bubbles where these are present. Preferably receptacles of between 70 mm and 110 mm in height can be inserted between the grill 274 and cartridge head 250.

The machine user interface 240 is located on the front of the housing 210 and comprises a start/stop button 241, and a plurality of status indicators 243–246.

The status indicators 243–246 preferably include a light emitting diode (LED) 243 to indicate readiness of the machine 201, a LED 244 to indicate if an error has occurred in the machine 201 operation, and one or more LEDs 245–256 to indicate whether the machine 201 is operating in manual or automatic modes. The LEDs 243–246 may be controlled to illuminate at a constant intensity, to flash intermittently, or both depending on the status of the machine 201. The LEDs 243–246 may have a variety of colours including green, red and yellow.

The start/stop button 241 controls commencement of the dispense cycle and is a manually operated push-button, switch or similar.

A volume adjustment control may be provided to allow a user of the machine 201 to manually adjust the volume of the delivered beverage without altering the other operating characteristics. Preferably the volume adjustment control allows an adjustment in volume of plus or minus 20%. The volume adjustment control may be a rotary knob, a linear slider, a digital readout with increment and decrement buttons, or similar. More typically, volume is controlled by a user operating the start/stop button 241.

A manual power switch (not shown) may be provided on the machine 201. Alternatively, power supply can be controlled simply by insertion or removal or the power supply plug from the mains power supply.

The water tank 220 is located to the rear of the housing 210 and is connected to the rear half 212 of the housing 210. The water tank 220 comprises a generally cylindrical body 221 which may be right circular or a frustum as desired for aesthetic reasons. The tank comprises an inlet for filling the tank with water which is closed off in use by a manually removable lid 222. An outlet is provided towards a lower end of the tank which communicates with the water pump 230. The water tank 220 may be made from a transparent or translucent material to allow a consumer to view the quantity of water remaining in the tank. Alternatively, the water tank 220 may be made from an opaque material but have provided a viewing window therein. In addition, or in place of the above, the water tank 220 may be provided with a low level sensor which prevents operation of the water pump 230 and optionally triggers a warning indicator, such as an LED, when the water level in the tank descends to a preselected level. The water tank 220 preferably has an internal capacity of approximately 1.5 litres.

Figure 43:
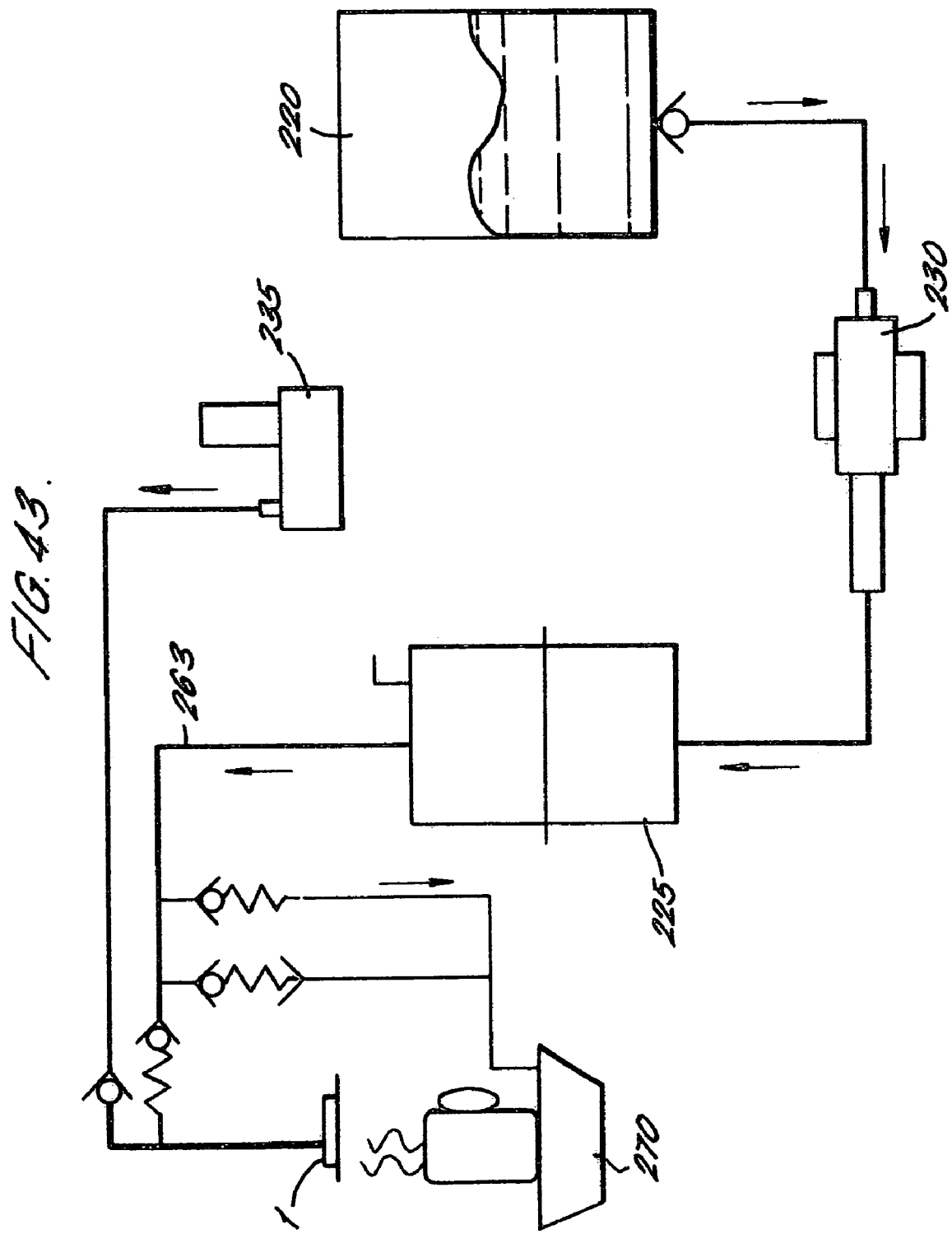
FIG. 43 is a schematic layout of the machine of FIG. 35.

The water pump 230 is operatively connected between the water tank 220 and the water heater 225 as shown schematically in FIG. 43 and is controlled by the control processor. The pump provides a maximum flow rate of 900 ml/min of water at a maximum pressure of 2.5 bar. Preferably, in normal use, the pressure will be limited to 2 bar. The flow rate of water through the machine 201 can be controlled by the control processor to be a percentage of the maximum flow rate of the pump by cycle chopping the electrical supply to the pump. Preferably the pump can be driven at any of 10%, 20%, 30%, 40%, 50%, 60%, 70%, 80%, 90% or 100% of the maximum rated flow rate. The accuracy of the volume of water pumped is preferably + or −5% leading to a + or −5% accuracy in the final volume of the dispensed beverage. A suitable pump is the Evolution EP8 pump produced by Ulka S.r.l. (Pavia, Italy). A volumetric flow sensor (not shown) is preferably provided in the flow line either upstream or downstream of the water pump 230. Preferably, the volumetric flow sensor is a rotary sensor.

The water heater 225 is located in the interior of the housing 210. The heater 225 has a power rating of 1550 W and is able to heat water received from the water pump 230 from a starting temperature of approximately 20° C. to an operating temperature of around 85° C. in under 1 minute. Preferably the dwell time between the end of one dispense cycle and the heater 225 being able to commence a subsequent dispense cycle is less than 10 seconds. The heater maintains the selected temperature to within + or −2° C. during the dispense cycle. As discussed below, the water for the dispense cycle may be delivered to the cartridge head 250 at 83° C. or 93° C. The heater 225 is able to quickly adjust the delivery temperature to either 83° C. or 93° C. from a nominal water temperature of 85° C. The heater 225 comprises an over-temperature cut-off which shuts off the heater if the temperature exceeds 98° C. Water output from the heater 225 is fed to the cartridge head 250 and cartridge 1 by means of a three-way valve. If the pressure of the water flow is acceptable the water is passed to the cartridge 1. If the pressure is below or above predetermined limits then the water is diverted by means of the three-way valve into the drip tray recovery receptacle 270.

The air compressor 235 is operatively connected to the cartridge head 250 by means of a one-way valve and controlled by the control processor. The air compressor 235 provides a maximum flow rate of air of 500 ml/min at 1.0 bar. In use a working volume of 35 ml is pressurised to 2.0 bar. Preferably, the air compressor 235 can produce two flow rates: a fast (or maximum) flow rate and a slow flow rate.

The control processor of the beverage preparation machine 201 comprises a processing module and a memory. The control processor is operatively connected to, and controls operation of, the water heater 225, water pump 230, air compressor 235 and user interface 240.

The memory of the control processor includes one or more variables for one or more operational parameters for the beverage preparation machine 201. In the illustrated embodiment the operational parameters are the temperature of the water passed through the beverage cartridge 1 during the operating stage, the speed of charging the beverage cartridge 1, the presence or otherwise of a soak step, the total dispensed volume of the beverage, the flow rate of the water during the discharge stage, and the flow rate and period of the purge stage.

The variables for the operational parameters are stored in the memory. The cartridge 1 comprises a code provided on or in the cartridge 1 representing the operational parameters required for optimal dispensation of the beverage in that cartridge 1. The code is in binary format and comprises a plurality of data bits corresponding to the variables stored in the control processor memory. Table 3 illustrates how 13 bits of data can be used to represent the necessary variables for the operational parameters described above.

TABLE 3

| Bit | Parameter | Description |
| --- | --- | --- |
| 0 & 1 | Water temperature | 00 = cold |
| | | 01 = warm |
| | | 10 = 83° C. |
| | | 11 = 93° C. |
| 2 & 3 | Cartridge charge | 00 = fast charge with soak |
| | | 01 = fast charge without soak |
| | | 10 = slow charge with soak |
| | | 11 = slow charge without soak |
| 4, 5, 6 & 7 | Beverage volume | 0000 = 50 ml |
| | | 0001 = 60 ml |
| | | 0010 = 70 ml |
| | | 0011 = 80 ml |
| | | 0100 = 90 ml |
| | | 0101 = 100 ml |
| | | 0110 = 110 ml |
| | | 0111 = 130 ml |
| | | 1000 = 150 ml |
| | | 1001 = 170 ml |
| | | 1010 = 190 ml |
| | | 1011 = 210 ml |
| | | 1100 = 230 ml |
| | | 1101 = 250 ml |
| | | 1110 = 275 ml |
| | | 1111 = 300 ml |
| 8, 9 & 10 | Flow rate | 000 = 30% |
| | | 001 = 40% |
| | | 010 = 50% |
| | | 011 = 60% |
| | | 100 = 70% |
| | | 101 = 80% |
| | | 110 = 90% |
| | | 111 = 100% |
| 11 & 12 | Purge | 00 = slow flow/short period |
| | | 01 = slow flow/long period |
| | | 10 = fast flow/short period |
| | | 11 = fast flow/long period |

The code on or in the cartridge 1 will normally comprises one or more extra data bits for error checking. In one example a 16 bit code is provided. For example, using the variables listed in Table 3, a cartridge 1 bearing the code "1000100011110" would have the following operational parameters:

| | |
|---|---|
| 10 | Water temperature of 83° C. |
| 00 | Fast charge with soak |
| 1000 | Dispensed drink volume of 150 ml |
| 111 | Flow rate equals 100% |
| 10 | Fast air flow purge/short period. |

Thus, unlike in previous beverage preparation machines, the memory of the control processor does not store operational instructions for beverage cartridges based on the cartridge type, i.e. instructions for a coffee cartridge, instructions for a chocolate cartridge, instructions for a tea cartridge etc. Instead the memory of the control processor stores variables for adjusting the individual operational parameters of the dispense cycle. This has a number of advantages. Firstly, a greater degree of control of the dispensation cycle can be exercised. For example, slightly different operational parameters can be used for different grades or blends of coffee rather than using the same parameters for all types of coffee. Prior coding solutions relying on storing instructions by cartridge type rather than by individual parameters are unsuited to such subtle differences in dispense cycles for similar beverage types because they quickly consume the available storage space in the coding medium and control processor. Secondly, the coding method of the present invention allows for new beverage cartridge types to be used in pre-existing beverage preparation machines even where the operational parameters for the dispense cycle for the new beverage cartridge 1 are only decided upon after sale of the beverage preparation machine 201. This is because the control processor of the beverage preparation machine 201 does not need to recognise that the beverage is of a new type. Rather the operational parameters of the dispense cycle are set without direct reference to the beverage type. Hence the coding method of the present invention provides excellent backward compatibility of the beverage preparation machines for new beverage types. In contrast, with prior machines, the manufacturer is restricted to dispensing a new beverage type using one of the pre-existing dispensation cycles as determined by the in-market machines.

The cartridge head 250 is shown in FIGS. 39 to 42. The cartridge holder 251 of the cartridge head 250 comprises a fixed lower part 255, a rotatable upper part 256 and a pivotable cartridge mount 257 positioned inbetween the fixed lower part 255 and the rotatable upper part 256. The upper part 256, lower part 255 and cartridge mount 257 are rotated about a common hinge axis 258. FIGS. 39 to 42 show the cartridge holder 251 with some components of the machine 201 omitted for clarity.

The rotatable upper part 256 and pivotable cartridge mount 257 are moved relative to the fixed lower part 255 by means of a clamping mechanism 280. The clamping mechanism 280 comprises a clamping lever having first and second members or parts 281 and 282. The first part 281 of the clamping lever comprises a U-shaped arm which is pivotably mounted to the upper part 256 at two first pivot points 283, one on each side of the cartridge holder 251.

The second part of the clamping lever comprises two over-centre arms 282, one on each side of the cartridge holder 251 which are each pivotably mounted to the upper part 256 at a second pivot point 285 located on the hinge axis 258 coupling the upper part 256 to the fixed lower part 255. Each over-centre arm 282 is a reciprocal member comprising a cylinder 282a, a stem 282b and a resilient sleeve 282c. The cylinder 282a has an internal bore and is rotatably mounted at one end at the hinge axis 258. A first end of the stem 282b is slidingly received in the bore of the cylinder 282a. The opposite end of the stem 282b is rotatably mounted to the U-shaped arm 281 at a third pivot point 286. The third pivot points 286 are unconnected to, and freely moveable relative to, the upper part 256 and lower part 255. The resilient sleeve 282c is mounted externally on the stem 282b and extends, in use, between abutment surfaces on the cylinder 282a and stem 282b. The resilient sleeve 282c accommodates shortening of the over-centre arm 282 but biases the over-centre arm 282 into an extended configuration. Movement of the third pivot points 286 towards and away from the hinge axis 258 is thus possible by relative movement of the stems 282b in the cylinders 282a. The resilient sleeves 282c are preferably formed from silicone. Whilst the illustrated embodiment uses two over-centre arms 282, it will be apparent that the closure mechanism my be configured with only one over-centre arm 282.

The U-shaped arm 281 extends around the front of the cartridge holder 251 and comprises two downwardly dependant hook members 287, one on each side of the cartridge holder 251, each comprising a cam surface 288 facing the hinge axis 258. The fixed lower part 255 of the cartridge holder 251 is provided with two bosses 259, or detents, located one on each side of the lower part 255 at or near a front edge 260 thereof aligned generally with the hook members 287.

Figure 39:
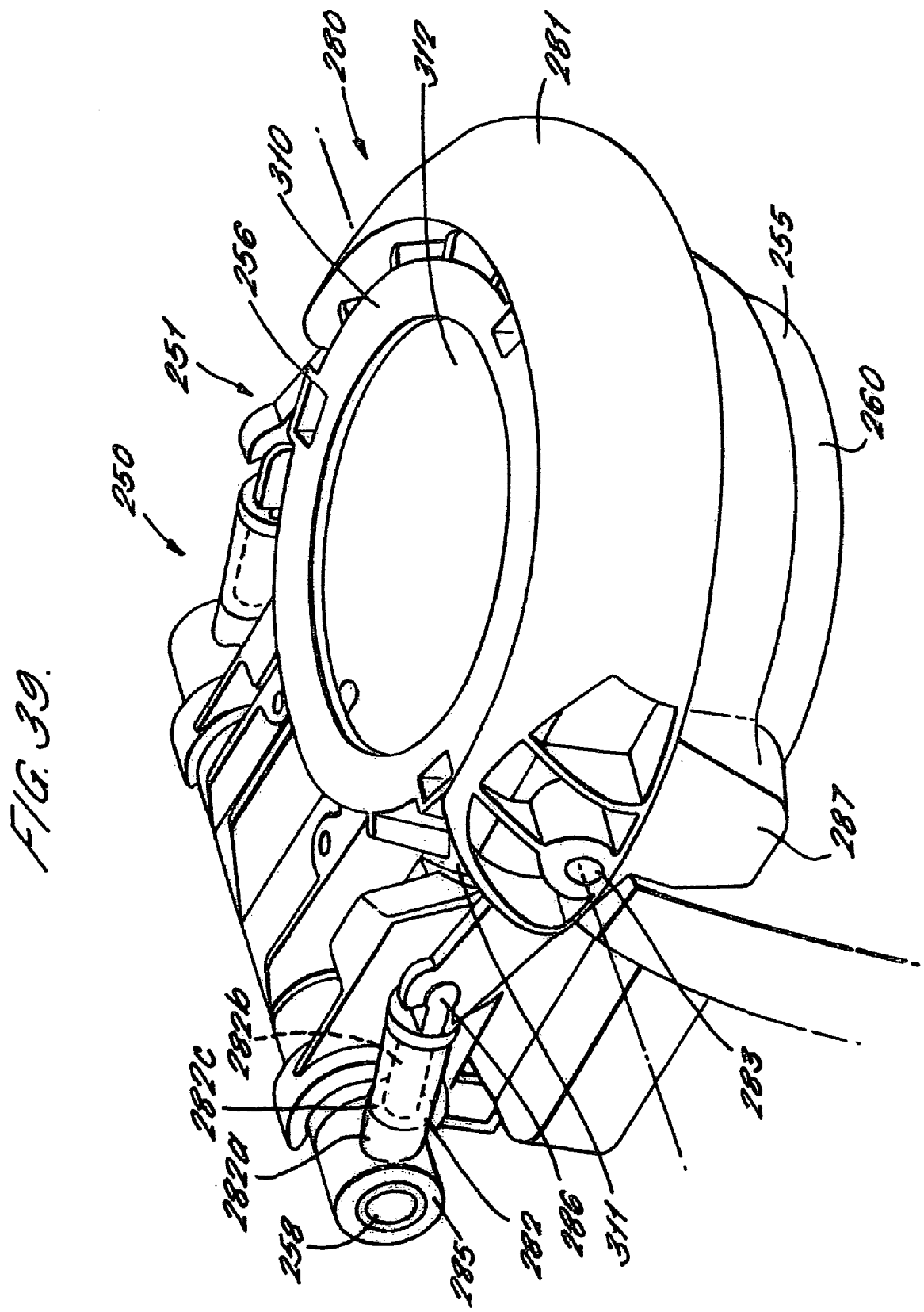
FIG. 39 is a perspective view of the cartridge head of the machine of FIG. 35 with some parts omitted for clarity.
Figure 40:
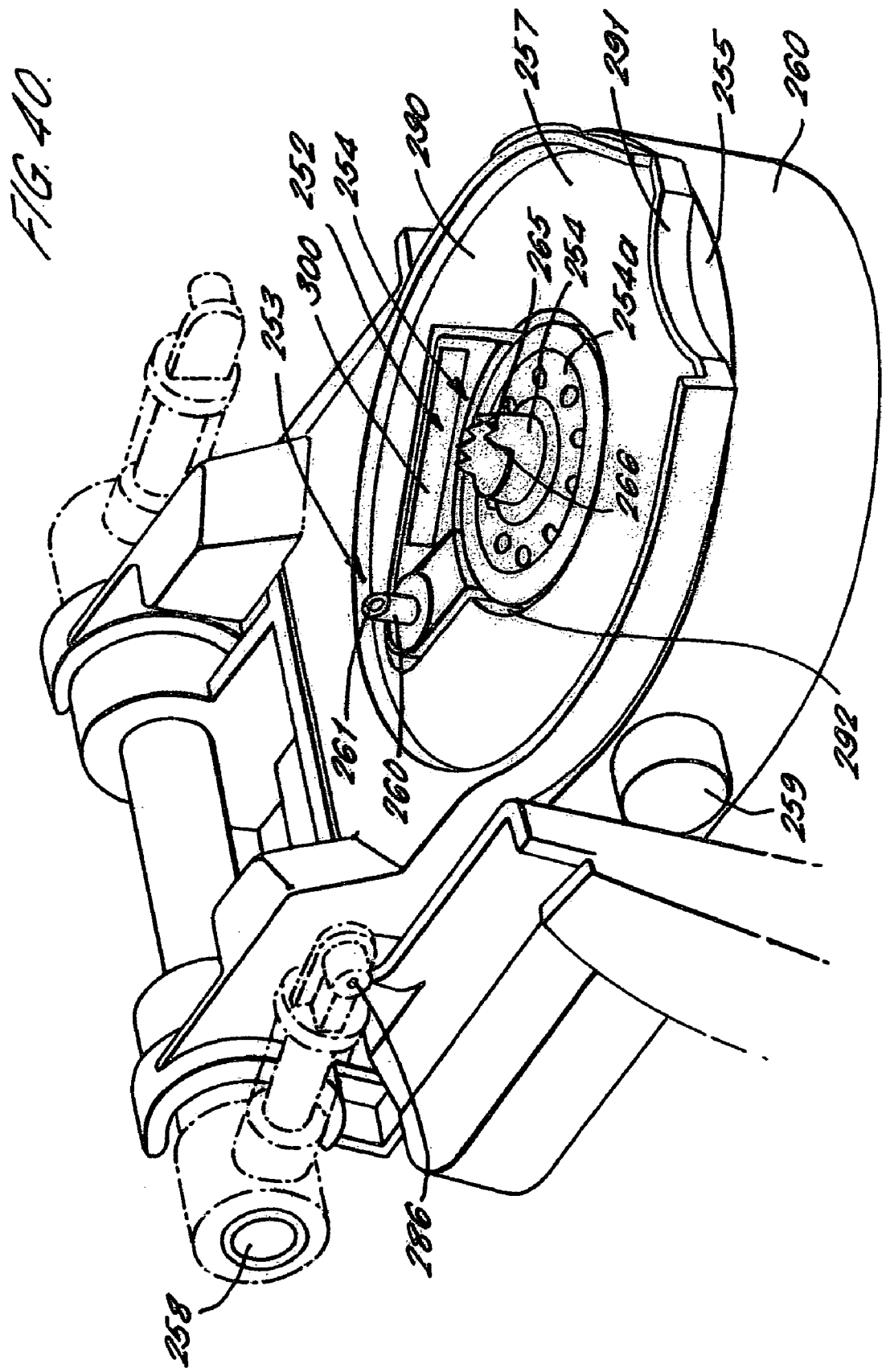
FIG. 40 is another perspective view of the cartridge head of the machine of FIG. 35 with some parts omitted for clarity.

As shown in FIG. 39, the U-shaped arm 281 may be formed from a one piece plastics moulding comprising an ergonomic hand grip and the hook members 287 integral to the arm.

Figure 41:
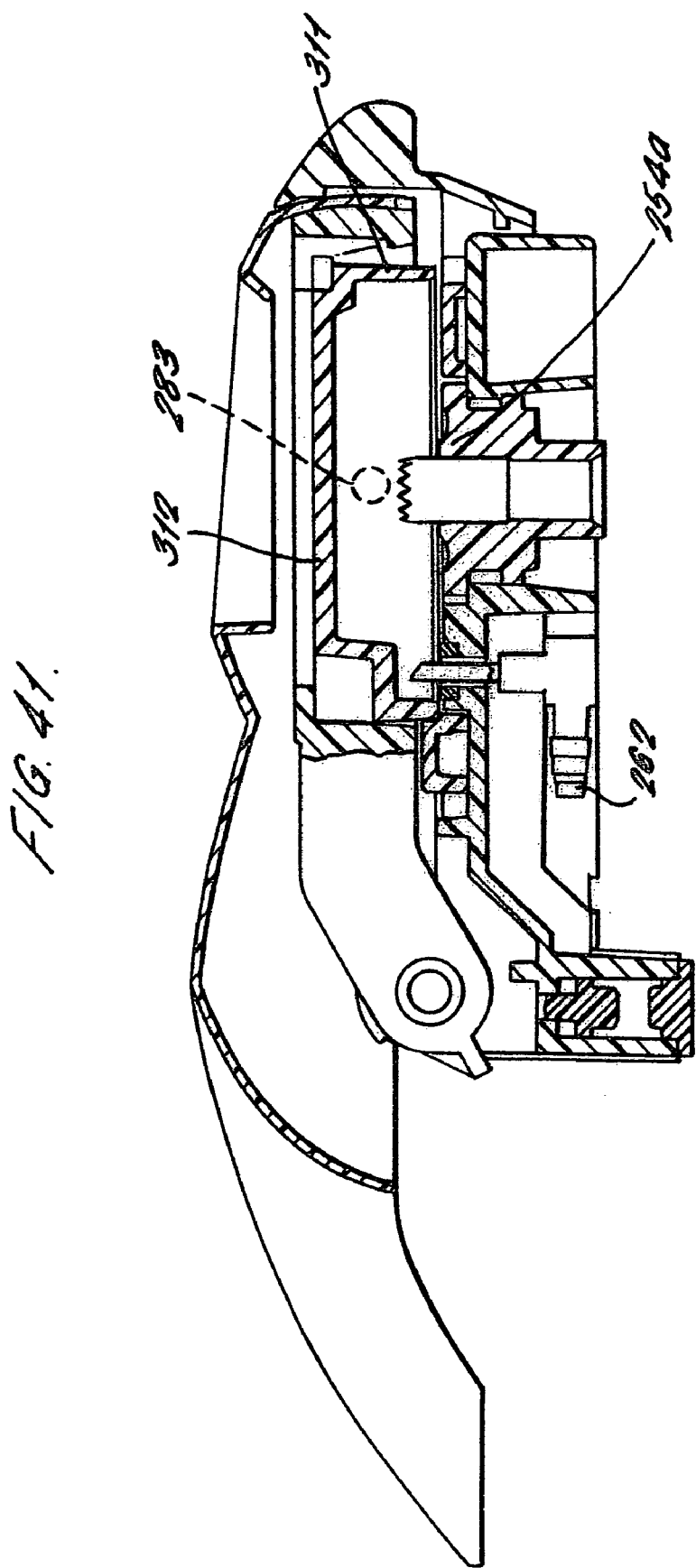
FIG. 41 is a cross-sectional view of the cartridge head in a closed position.

The cartridge mount 257 is rotatably mounted between the upper and lower parts 255, 256 of the cartridge holder 251. The mount 257 is provided with a substantially circular recess 290 which receives in use the beverage cartridge 1. The recess 290 includes an irregularity 291 for accommodating the handle portion 24 of the beverage cartridge 1 which also acts to prevent rotation of the beverage cartridge 1 in the cartridge holder 251. The cartridge mount 257 is sprung relative to the fixed lower part 255 such that in the open position, as shown in FIG. 41, the cartridge mount 257 is biased out of contact with the fixed lower part 255 so that the cartridge mount 257 is moved out of contact with the outlet and inlet piercer members 254, 253. The cartridge mount 257 is provided with an aperture 292 for receiving therethrough the inlet and outlet piercers 253, 254 and a head 300 of the cartridge recognition means 252 when the cartridge mount 257 is moved into the closed position.

The upper part 255 comprises a generally circular body 310 housing a circular viewing window 312 through which a consumer can view the beverage cartridge 1 during a dispense cycle and also visually confirm whether a cartridge 1 is loaded in the machine 201. The viewing window 312 is cup-shaped having a downwardly directed rim 311. The viewing window 312 is able to move axially relative to the body 310 of the upper part 255. One arrangement of accomplishing the relative movement is to provide a wave spring (not shown), or similar resilient means such as a rubberised ring, positioned between the viewing window 312 and the circular body 310. In an alternative arrangement, a series of helical compression springs (not shown) are provided extending between the viewing window 312 and the body 310. In both cases the resilient means allows the viewing window 312 to move axially relative to the circular body 310 by a small degree.

When the cartridge holder 251 is in the closed position, the viewing window 312 bears against the beverage cartridge 1 biasing it against the lower part 256. In one arrangement, the rim 311 of the viewing window contacts and bears against the flange 35 of the beverage cartridge. At the same time the window 312 contacts the closed top 11 of the cartridge 1. In an alternative arrangement, only the viewing window 312 contacts the closed top 11 of the cartridge 1, and there is no bearing contact between the rim 311 and the flange 35. The pressure exerted by the rim 311 on the flange 35 and/or by the window 312 on the closed top 11 ensures a fluid tight seal between the cartridge 1 and the cartridge holder 251.

Figure 42:
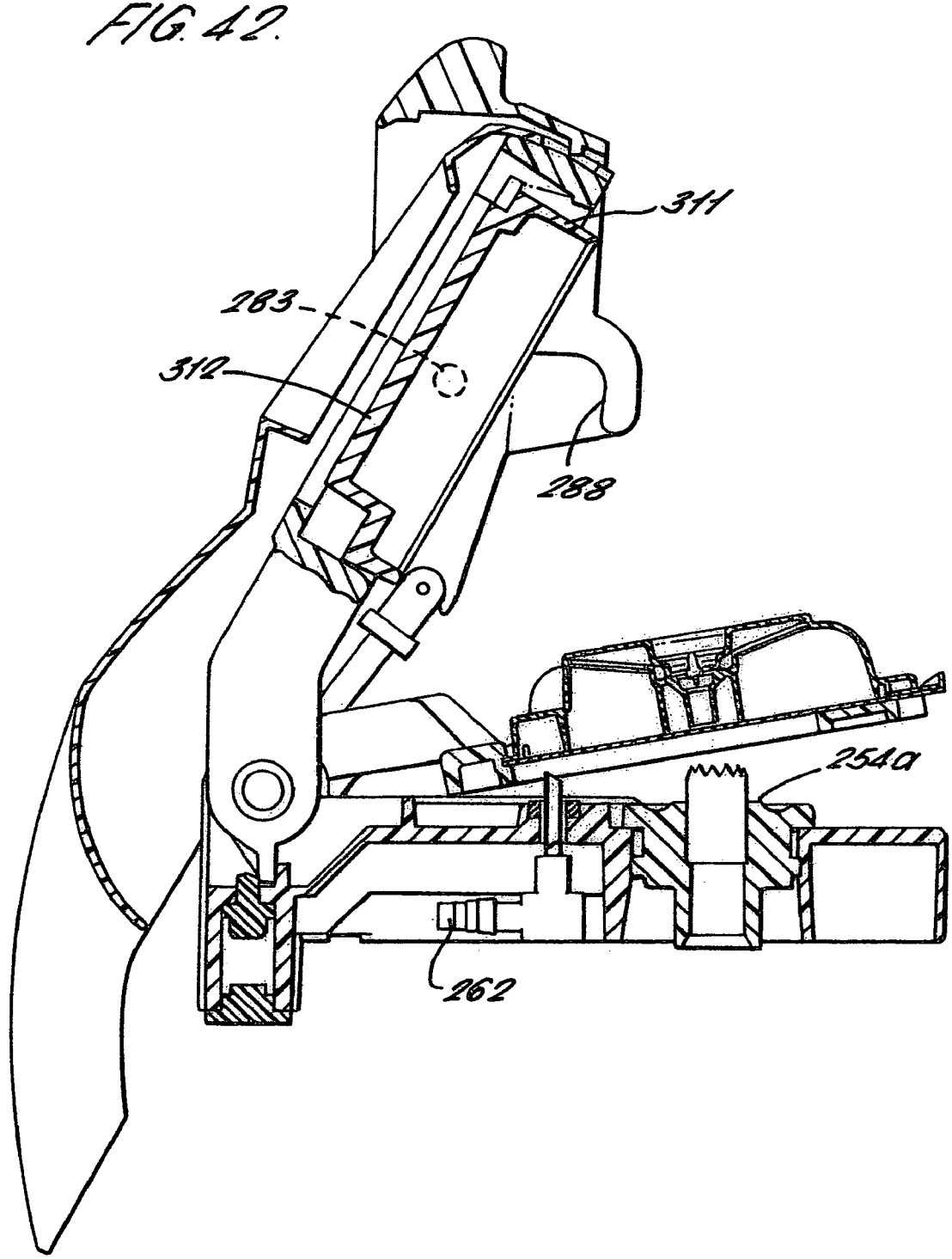
FIG. 42 is a cross-sectional view of the cartridge head in an open position.

The lower part 255 comprises the inlet and outlet piercers 253, 254 and the head 300 of the cartridge recognition means 252. The inlet piercer 253 comprises a hollow needle-like tube 260 having a sharpened end 261 for perforating the laminate 5 of the beverage cartridge 1 in use. The inlet piercer 253 is in fluid communication with a water conduit 262 as shown in FIG. 42 which passes through the lower part 255 and is connected to an outlet conduit 263 of the water heater 225. The outlet piercer 254 is similar in type to the outlet piercer described in the applicant's European patents EP 0 389 141 and EP 0 334 572 and comprises an open ended cylinder 264 of circular or D-shaped cross-section having dimensions larger than the discharge spout 43. An arcuate portion 265 of the upper end of the outlet piercer 254 is serrated to pierce and eventually cut the laminate of the beverage cartridge 1. The remainder of the upper end is cut back longitudinally of the cylinder at least to the base of the teeth 266 of the serrated portion to fold or pull the cut laminate 5 away from the outlet aperture before the beverage is dispensed therethrough. The outlet piercer 254 pierces the laminate 5 externally of the discharge spout 43 and when the cartridge mount 257 is in the closed position, rests in the annulus between the discharge spout 43 and the outer wall 42 of the discharge funnel 40. The outlet piercer 254 folds back the cut laminate 105 into the annulus. Thereby both the outlet piercer 254 and the cut laminate 105 are held out of the way of the discharged beverage.

The outlet piercer 254 is surrounded by a ledge 254a which is raised relative to its surroundings by 0.5 mm.

Advantageously, the outlet piercer 254 is removable from the lower part 255 to enable it to be thoroughly cleaned, for example, in a dishwasher. The removable outlet piercer 254 is received in a recess 267 in the lower part 255 where it is seated. The inlet piercer 253 and/or the outlet piercer 254 may be made of a metal, such as stainless steel, or from a plastics material. Advantageously, the use of plastic cutting elements is enabled by use of a laminate 5 which is able to be punctured and cut by a non-metallic material. Consequently, the piercers 253, 254 can be made less sharp which lowers the risk of injury to the consumer. In addition, plastic piercing elements are not prone to rust. Preferably, the inlet piercer 253 and the outlet piercer 24 are formed as a single, integral unit which is removable from the lower part 255.

In use, the upper part 256 of the cartridge holder 251 is movable from an open position in which it is orientated vertically or towards the vertical as shown in FIG. 36, to a closed position in which it is orientated substantially horizontally and in interengagement with the fixed lower part 255 and cartridge mount 257. The upper part 256 is moved from the open to the closed positions by operation of the clamping lever. To close the upper part 256 a user takes hold of the clamping lever by the U-shaped arm 281 and pulls downwards. Consequently, the upper part 256 rotates which first brings the rim 311 of the viewing window 312 into contact with the flange 35 of the beverage cartridge 1 in the cartridge mount 257 and/or the window 312 itself into contact with the closed top 11 of the cartridge 1. Continued rotation of the upper part 256 rotates the upper part 256 and cartridge mount 257 down into contact with the lower part 255. Further rotation of the U-shaped arm 281 causes the U-shaped arm 281 to rotate relative to the upper part 256 and the lower part 255 resulting in the hook members 287 of the upper part 256 engaging the bosses 259 of the lower part 255 with the cam surface 288 riding over the bosses 259. During this last stage of rotation the cartridge 1 is compressed between the cartridge mount 257 and the viewing window 312. As a result, the viewing window 312 is moved axially relative to the circular body 310 of the upper part 256 against the bias of the wave spring or helical springs. This movement allows for a take up of tolerances in the beverage cartridge 1 and beverage preparation machine and ensures that the amount of compressive force applied to the cartridge is kept within an acceptable range. The clamping force of the mechanism as moderated by the action of the wave spring or helical springs ensures a clamping pressure on the cartridge. For the arrangement where bearing pressure is applied to both the flange 35 and the closed top 11 of the cartridge 1, it has been found that a pressure of between 130 and 280 N is required. Preferably the force is approximately 200 N. A force less than about 130 N does not provide an adequate seal, whilst a force greater than about 280 N leads to plastic failure of the components of the cartridge 1. For the arrangement where bearing pressure is applied only to the closed top 11 of the cartridge 1 it has been found that a pressure of between 50 N and 280 N is required. It will be noted that a lower pressure level is possible with this arrangement without a deleterious effect on the sealing of the cartridge 1. During closure of the cartridge head the laminate 5 of the cartridge 1 is tensioned as it is brought into contact with the ledge 254a surrounding the outlet piercer 254 which causes the laminate 5 to flex out of plane as the distal end of the outer tube 42 of the cylindrical funnel is moved upwardly by 0.5 mm relative to the flange 35. This movement also ensures that the great majority of the compressive force applied to the cartridge acts through the central region of the cartridge 1 through the load-bearing inner member 3. In the closed position the cartridge 1 may thus be clamped around the flange 35 by means of the rim 311 of the viewing window 312 and is always firmly clamped between the closed top 11 of the cartridge and the outer tube 42 of the inner member 3 by contact with the viewing window 312 and the ledge 254a. These clamping forces help prevent failure of the cartridge 1 during pressurisation and also ensure that the inner member 3 and outer member 2 are fully seated relative to one another and thus that all internal passageways and apertures remain at their intended dimensions even during internal pressurisation.

An imaginary datum line can be drawn between the first and second pivot points 283, 285 of the cartridge holder 251. As can be seen in FIG. 41, in the open position the third pivot points 286 are located on the side of the datum line nearest the fixed lower part 255. As the upper part 256 reaches the closed position, the third pivot points 286 of the clamping lever pass through the datum line joining the first and second pivot points 283, 285 to the opposite side of the line, furthest from the fixed lower part 255. Consequently, the U-shaped arm 281 'snaps through' from a first stable position to a second stable position. The snap through action is accommodated by shortening of the over-centre arms 282 and consequential compression of the resilient sleeves 282c. Once the third pivot points 286 are past the imaginary datum line then recovery of the resilient sleeves 282c acts to continue the motion of the third pivot points 286 away from the imaginary datum line. The clamping lever thus has a bi-stable operation in that the lever is stable in the open or closed positions but unstable at the point when the third pivot points 286 lie on the imaginary datum line joining the first and second pivot points 283, 285. Thus, the snap-through action of the clamping lever provides a positive closure mechanism which leads to a definite closure action wherein in the final stages of the clamping lever's rotation, the snap-through action of the U-shaped arm 281 and second arms 284 forces the hook members 287 firmly into engagement with the bosses 259. In addition, the resilient sleeves 282c provide a resistance to re-opening of the upper part 256 since a minimum force is required to compress the sleeves 282c sufficiently to move the third pivot points 286 back into line with the datum line joining the first and second pivot points 283, 285. Advantageously, the interengagement of the hook members 287 and the bosses 259 prevents separation of the upper and lower parts other than by rotation of the clamping lever. This is useful in preventing opening of the cartridge head 250 during operation when the cartridge head 250 is subject to internal pressurisation.

Figure 44A:
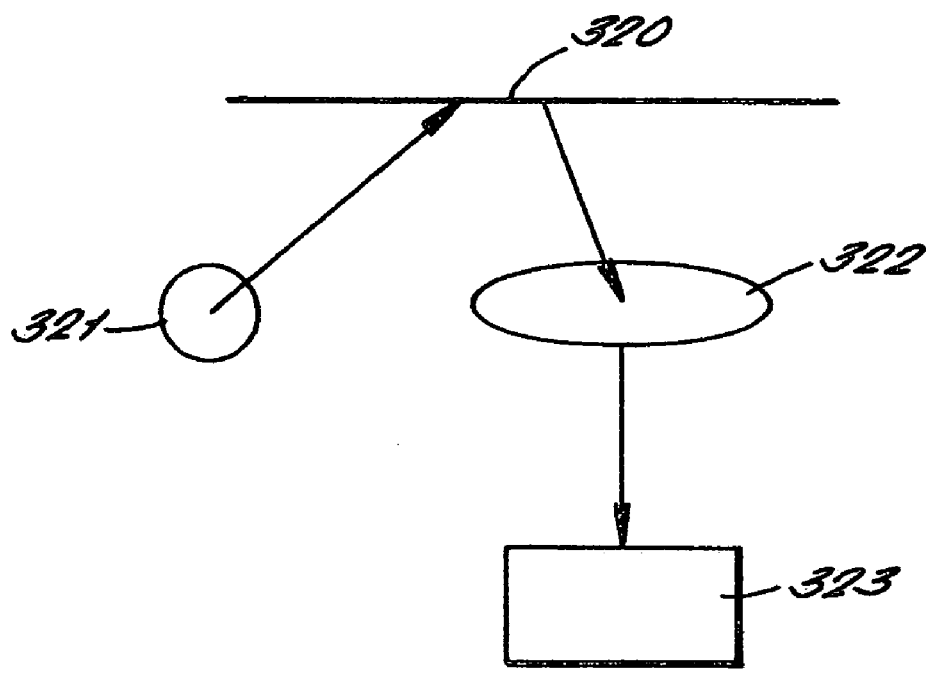
FIGS. 44a and 44b are schematic layouts of first and second code recognition means for the machine of FIG. 35.
Figure 44B:
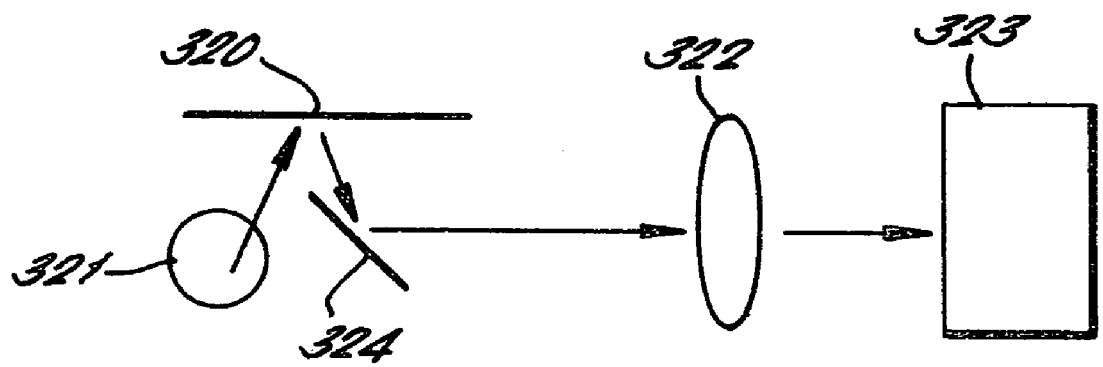
Figure 45:
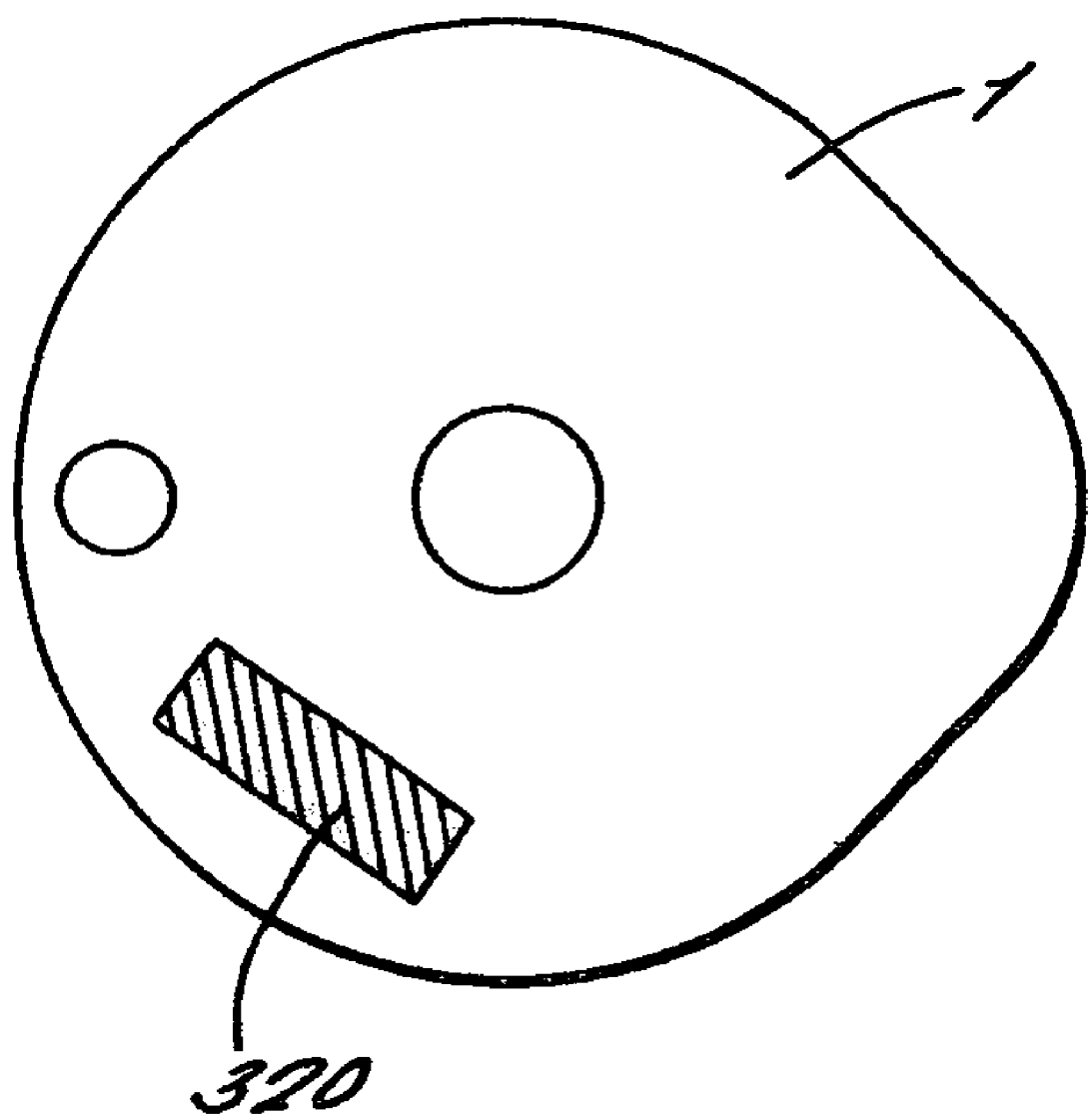
FIG. 45 is a plan view of a beverage of the present invention comprising a barcode.

The purpose of the cartridge recognition means 252 is to allow the machine 201 to recognise the type of beverage cartridge 1 that has been inserted and to adjust one or more operational parameters accordingly. In a typical embodiment, the cartridge recognition means 252 comprises an optical barcode reader which reads a printed barcode 320 provided on the laminate 5 of the beverage cartridge 1 as shown in FIG. 45. The barcode 320 is formed from a plurality of bars of contrasting colour. Preferably the bars are black on a white background to maximise the contrast. The barcode 320 is not required to conform to a published standard but a standard format for barcodes, such as EAN-13, UPC-A, or Interleaf 2 of 5 may be used. The optical barcode reader comprises one or more LEDs 321 to illuminate the barcode 320, a focusing lens 322 to acquire an image of the barcode, a charge coupled device (CCD) 323 for producing an electrical signal representative of the acquired image and support circuitry for the LEDs and CCD. The space in the lower part for accommodating the barcode reader is limited. A mirror or mirrors 324 may be used to reflect the light from the LEDs 321 to a focussing lens which is not located in the lower part 255. Schematic arrangements are shown in FIGS. 44a and 44b. The lower part 255 comprises an aperture 326 which is the same size as the barcode 320 on the beverage cartridge 1. In use the electrical signals produced are decoded by signal processing software and the results forwarded to the control processor. The software can recognise whether the read of the barcode contained errors. The barcode 320 may be rescanned a number of times before an error message is presented to the consumer. If the machine 201 is unable to read the barcode the consumer is able to use the beverage cartridge 1 to dispense a beverage using a manual mode of operation.

The cartridge head 250 also includes a cartridge sensor for detecting whether a cartridge is present in the cartridge holder 251.

The cartridge head 250 also includes a lock sensor which detects whether the cartridge holder 251 is properly closed. Preferably the lock sensor comprises a micro-switch which is triggered when the cartridge holder 251 is closed and locked. Preferably the cartridge sensor and lock sensor are connected in series such that the output of both sensors must be satisfactory, i.e. cartridge present and mechanism locked, before the dispense cycle can be commenced.

Operation of the machine 201 comprises insertion of a beverage cartridge 1 into the cartridge head 250, carrying out a dispense cycle in which the beverage is dispensed and removal of the cartridge 1 from the machine.

The operational behaviour of the machine 201 is determined by software embedded in the control processor. Operation of the machine can be described in terms of 'States', wherein the machine 201 will normally exist in a particular State until an event occurs to change the State, a step called a State transition.

Table 4 shows a State Transition Table which illustrates the States and State transitions for one embodiment of the beverage preparation machine 201.

TABLE 4

| State | State Description | Temperature | Lock Sensor | Cartridge Sensor variable (OK, NOK, CLR) | Water level indicator | Water flow rate | StartStop |
|---|---|---|---|---|---|---|---|
| 1 | WATER HEATING | > or = 85 goto 2 | Closed: [Cartridge Sensor = readpod( )] Open: [Cartridge Sensor = CLR] | N/A | Low goto 10 | N/A | No Action |
| 2 | WATER READY If timeout 10 mins goto 9 | <85 goto 2 | Closed: [Cartridge Sensor = readpod( )] Open: [Cartridge Sensor = CLR] | Cartridge Sensor = OK goto 4 Cartridge Sensor = NOK goto 3 | Low goto 10 | N/A | No Action |
| 3 | READY TO BREW AUTO | N/A [temperature controlled in background] | Open: [Cartridge Sensor = CLR] goto 2 | N/A | Low goto 10 | N/A | Goto 5 |
| 4 | BREW IN PROGRESS AUTO [Run Brew State] goto 7 | N/A [temperature controlled in background] | Open: [Cartridge Sensor = CLR] goto 10 | N/A | Low goto 10 | No flow goto 10 | Water off goto 6 |

TABLE 4-continued

| State | State Description | Temperature | Lock Sensor | Cartridge Sensor variable (OK, NOK, CLR) | Water level indicator | Water flow rate | StartStop |
|---|---|---|---|---|---|---|---|
| 5 | BREW SUSPENDED | N/A [temperature controlled in background] | Open: [Cartridge Sensor = CLR] goto 10 | N/A | Low goto 10 | N/A | Goto 5 |
| 6 | READY TO BREW MANUAL | N/A [temperature controlled in background] | Open: [Cartridge Sensor = CLR] goto 2 | N/A | Low goto 10 | N/A | [Water On] Goto 8 |
| 7 | BREW IN PROGRESS MANUAL | N/A [temperature controlled in background] | Open: [Cartridge Sensor = CLR] goto 10 | N/A | Low goto 10 | No flow goto 10 | Released goto 7 |
| 8 | PURGE [Water off; air on, timeout n sec then goto 9] | N/A [temperature controlled in background] | Open: [Cartridge Sensor = CLR] goto 10 | N/A | No action | N/A | No Action |
| 9 | BREW DONE [air purge] [Cartridge Sensor = CLR] if timeout 10 s goto 2 | N/A [temperature controlled in background] | Open goto 2 | N/A | Low goto 10 | N/A | Goto 9 |
| 10 | STANDBY | N/A [heater off] | Open: [Cartridge Sensor = CLR] goto 1 Closed: [Cartridge Sensor = readpod( )] | N/A | Low goto 10 | N/A | Goto 1 |
| 11 | ERROR Power off/on required to clear | N/A | N/A | N/A | N/A | N/A | N/A |
| 12 | WATER LOW | | | | Low goto 10 | | |

The following example illustrates a dispense cycle to exemplify the use of the State Transitions by the control processor.

It is assumed that the machine 201 is initially switched off and with no cartridge 1 inserted in the cartridge head 250. When the machine 201 is switched on the control processor is in State 1. The water heater 225 is switched on. Once the temperature reaches 85° C. the control processor transits to State 2. If at any time during State 1 or 2 the cartridge holder 251 is closed the lock sensor will be triggered to send a signal to the control processor indicating that the cartridge holder 251 is properly closed. The control processor then interrogates the cartridge sensor by sending a 'readpod' instruction. The cartridge sensor returns a signal to the control processor indicating whether a cartridge is in place in the cartridge holder 251. If no cartridge is present the control processor transits to State 3 where it remains in a readiness state until the cartridge holder 251 is reopened at which point the control processor transits back to State 2. If a cartridge is present in State 2 then the control processor transits to State 4 and operation is commenced automatically. During States 4 to 9 the water temperature is controlled in the background to remain within the required tolerance range of the desired temperature as set by the operational parameters set by the barcode on the beverage cartridge 1. Once the discharge stage of dispense is completed an air purge is commenced in State 8. Once the air purge is completed the operating cycle is completed and the machine enters to standby mode in State 10. If, during operation, an error occurs then the processor transits to State 11. If a low water level is detected then the processor transits to State 12.

To insert the cartridge 1 the cartridge holder 251 is opened as described above to expose the cartridge mount 257. The cartridge 1 is then placed on the cartridge mount 257 received within the recess 290 such that the handle 24 of the cartridge is located in the irregularity 291. The optical or magnetic barcode 320 of the cartridge 1 is orientated directly above the aperture 326 in the cartridge mount 257. The cartridge holder 251 is then closed by operation of the clamping lever as described above. During closure the inlet and outlet piercers 253, 254 pierce the laminate 5 of the cartridge 1 to form the cartridge inlet 121 and outlet 122. As described above the laminate 5 cut by the outlet piercer 254 is folded up into the annulus surrounding the discharge spout 43. When closed the cartridge holder 251 grips the cartridge 1 around the rim 35 between the cartridge mount 257 and the upper part 256 and/or between the window 311 and the top 11 of the cartridge 1 to form a fluid tight seal of sufficient integrity to withstand the pressures developed during the dispense cycle.

To commence the operating cycle the consumer operates the start/stop button 241.

The operating cycle comprises the steps of cartridge recognition and the discharge cycle.

Cartridge recognition is performed by the optical cartridge recognition means 252 as described above assuming that the outputs from the cartridge sensor and lock sensor are satisfactory. Once the barcode 320 has been decoded the operational parameters of the machine 201 are adjusted by the control processor. The discharge cycle is then automatically commenced.

The discharge cycle has four main stages, not all of which are used for all beverage types:
(i) Pre-wet
(ii) Pause
(iii) Brew/Mixing
(iv) Purge In the pre-wet stage the cartridge 1 is charged with water from the water storage tank 220 by means of the water pump 230. The charging with water causes the beverage ingredients 200 in the filtration chamber 130 to be wetted. The charging may take place at a "fast" flow rate of 600 ml/min or a "slow" flow rate of 325 ml/min. The slow charging rate is particularly useful for cartridges containing viscous liquid beverage ingredients where the ingredients require some dilution before they are able to be pumped at a higher volume flow rate. The volume of water injected into the cartridge 1 is selected to ensure that water or beverage does not drip out of the cartridge outlet 122 during this stage.

The pause stage allows the beverage ingredients 200 to soak in the water injected during the pre-wet stage for a predetermined period of time. Both the pre-wetting and soaking stages are known to increase the yield of the extractibles from the beverage ingredients 200 and to improve the end flavour of the beverage. Pre-wetting and soaking are particularly used where the beverage ingredients are roast and ground coffee.

In the brew/mixing stage water is passed through the cartridge 1 in order to produce the beverage from the beverage ingredients 200. The temperature of the water is determined by the control processor which sends instructions to the water heater 225 to heat the water passing from the water tank 220 to the cartridge head 250. Water enters the lower part 255 of the cartridge holder 251 through the conduit 262 via the inlet valve and the inlet piercer 253 into the inlet chamber 126 of the beverage cartridge 1. Brewing and/or mixing and subsequent dispensing of the beverage from the beverage cartridge 1 is as described above with reference to the versions of the beverage cartridge 1.

The air purge comprises the blowing of pressurised air through the beverage preparation machine and the beverage cartridge 1 to ensure that all beverage is dispensed and that the flow path is cleared ready for dispensing another beverage. The air purge does not commence immediately on cessation of the brew/mixing stage to allow for the majority of the fluid to clear the flow path. This prevents an unacceptable spike in internal pressure on commencement of the air purge.

In normal operation a user manually stops the machine 201 by operating the start/stop button 241.

Once the operating cycle has been completed the consumer removes the cartridge 1 by opening the cartridge holder 251 and manually removing and disposing of the cartridge. Alternatively, the machine 201 may be provided with an automatic ejection mechanism for removing the cartridge automatically on opening the cartridge holder 251.

The delivery times for beverages using the machine 201 and cartridges 1 are typically between 10 and 120 seconds, preferably 30 to 40 seconds for roast and ground coffee, between 5 and 120 seconds, preferably 10 to 20 seconds for chocolate and between 5 and 120 seconds, preferably 10 to 20 seconds for milk.

The machine 201 may also advantageously comprise a memory in operative communication with the control processor that stores information on the type of beverage dispensed by a user. The operating cycle of the machine 201 may then be adjusted for the next cartridge 1. This is especially advantageous where two or more beverage cartridges 1 are used sequentially to form a beverage. For example a coffee cartridge may be dispensed followed by a milk cartridge to form a cappuccino beverage. Alternatively a chocolate cartridge could be used followed by a milk cartridge to produce a creamy hot chocolate beverage. By using a memory that stores information on the first beverage dispensed, the manner of dispensing the second cartridge, say a milk cartridge, may be altered to achieve an optimum beverage. In the above example the milk dispensed for hot chocolate may, typically, be diluted less than the milk added to the coffee. In addition, the milk dispensed for chocolate may be dispensed at a slower flow rate to lessen the degree of foaming of the beverage. Many combinations of cartridges are possible and operating parameters as will be obvious to the skilled person. In addition, the memory may be used to allow the machine 201 to 'predict' the type of beverage that a user will next want to dispense. For example, if a user predominantly drinks one beverage type then the machine can instruct the water heater to remain at the optimum temperature for that beverage type.

The invention claimed is:

1. A closure mechanism for a beverage preparation machine comprising a fixed lower part, an upper part rotatable relative to the lower part and a cartridge holder interposed between the lower part and the upper part and being rotatable relative to the lower part and the upper part, wherein the lower part comprises inlet piercing means and outlet piercing means for forming, respectively, an inlet and an outlet, in use, in a cartridge received in the cartridge holder, wherein rotation of the upper part towards the lower part causes the upper part to engage the cartridge holder and to pivot the cartridge holder into contact with the lower part and at the same time to cause, in use, the inlet piercing means and the outlet piercing means to pierce a cartridge received in the cartridge holder.

2. A closure mechanism as claimed in claim 1 wherein the upper part is moveable from between an open position for receiving a cartridge in the cartridge holder and a closed position in which the cartridge holder is in contact with the lower part.

3. A closure mechanism as claimed in claim 2 wherein in the open position the upper part is oriented substantially vertically.

4. A closure mechanism as claimed in claim 3 wherein in the closed position the upper part is orientated horizontally.

5. A closure mechanism as claimed in claim 4, wherein the cartridge holder comprises a recess for receiving a cartridge.

6. A closure mechanism as claimed in claim 5 wherein the recess comprises an irregularity for preventing rotation of a cartridge received in the recess.

7. A closure mechanism as claimed in claim 6 wherein the cartridge holder is biased relative to the fixed lower part such that in an open position with the upper part disengaged from the lower part and the cartridge holder, the cartridge holder is disengaged from the lower part.

8. A closure mechanism as claimed in claim 7 wherein, in the open position, the cartridge holder is disengaged from the inlet piercing means and the outlet piercing means.

* * * * *